United States Patent [19]
Goody

[11] Patent Number: 6,097,721
[45] Date of Patent: Aug. 1, 2000

[54] METHOD AND APPARATUS FOR IDENTIFYING SIGNALS FOR A SET OF COMMUNICATION DEVICES IN A SIGNAL STREAM HAVING SIGNALS FOR A NUMBER OF DIFFERENT SETS OF COMMUNICATION DEVICES

[75] Inventor: Steven H. Goody, Granite Bay, Calif.

[73] Assignee: Next Level Communications, Rohnert Park, Calif.

[21] Appl. No.: 08/905,822

[22] Filed: Aug. 4, 1997

[51] Int. Cl.[7] ................................................ H04Q 11/00
[52] U.S. Cl. ......................... 370/379; 370/395; 370/916
[58] Field of Search .................................... 370/375–376,
370/378–379, 345, 352, 395, 458, 486–487,
489–490, 536, 537, 539, 906, 907, 916

[56] References Cited

U.S. PATENT DOCUMENTS

| | | | |
|---|---|---|---|
| 3,988,545 | 10/1976 | Kuemmerle et al. | 370/537 |
| 5,272,696 | 12/1993 | Munter et al. | 370/395 |
| 5,459,720 | 10/1995 | Iliev et al. | 370/468 |
| 5,684,954 | 11/1997 | Kaiserswerth et al. | 370/393 |

*Primary Examiner*—Chi H. Pham
*Assistant Examiner*—Maikhanh Tran
*Attorney, Agent, or Firm*—Morrison & Foerster LLP

[57] ABSTRACT

The invention provides method and apparatus for identifying signals for a set of communication devices in a signal stream having signals for a number of different sets of communication devices. Some embodiments of the invention are methods and devices for extracting signals for a first set of communication devices from a signal stream having signals for a number of different sets of communication devices. Other embodiments of the invention are methods and devices for inserting into a signal stream signals from a first set of communication devices. Yet other embodiments of the invention are time division multiplexing and demultiplexing methods and apparatuses that use a content addressable memory to identify sets of signals for a particular set of communication devices. In addition, some embodiment of the invention are used in fiber optic telecommunication networks. These embodiments include an optical network unit that receives an integrated signal stream having signals for different types of applications. The optical network unit includes a content addressable memory that stores locations in the received signal stream of signals for a first type of communication application.

23 Claims, 9 Drawing Sheets

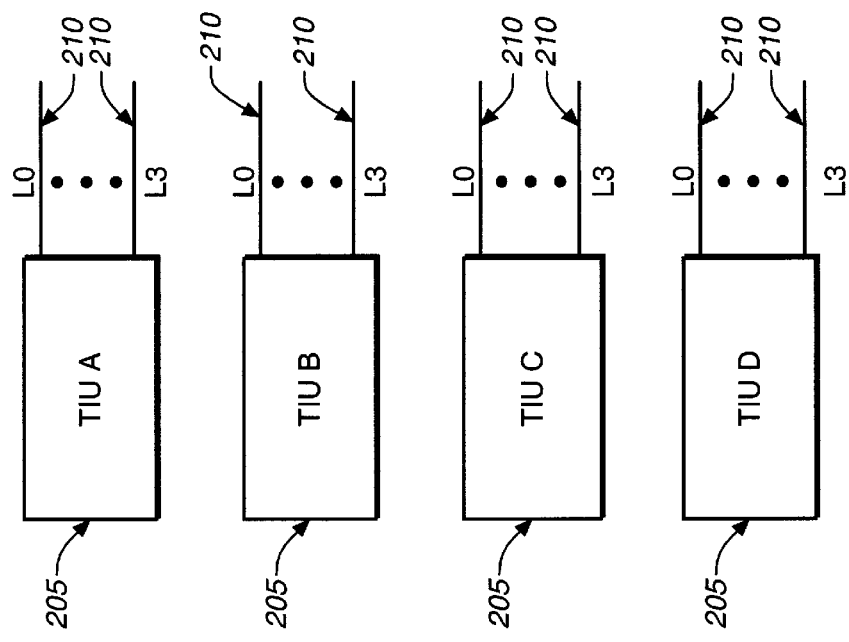
FIG._2
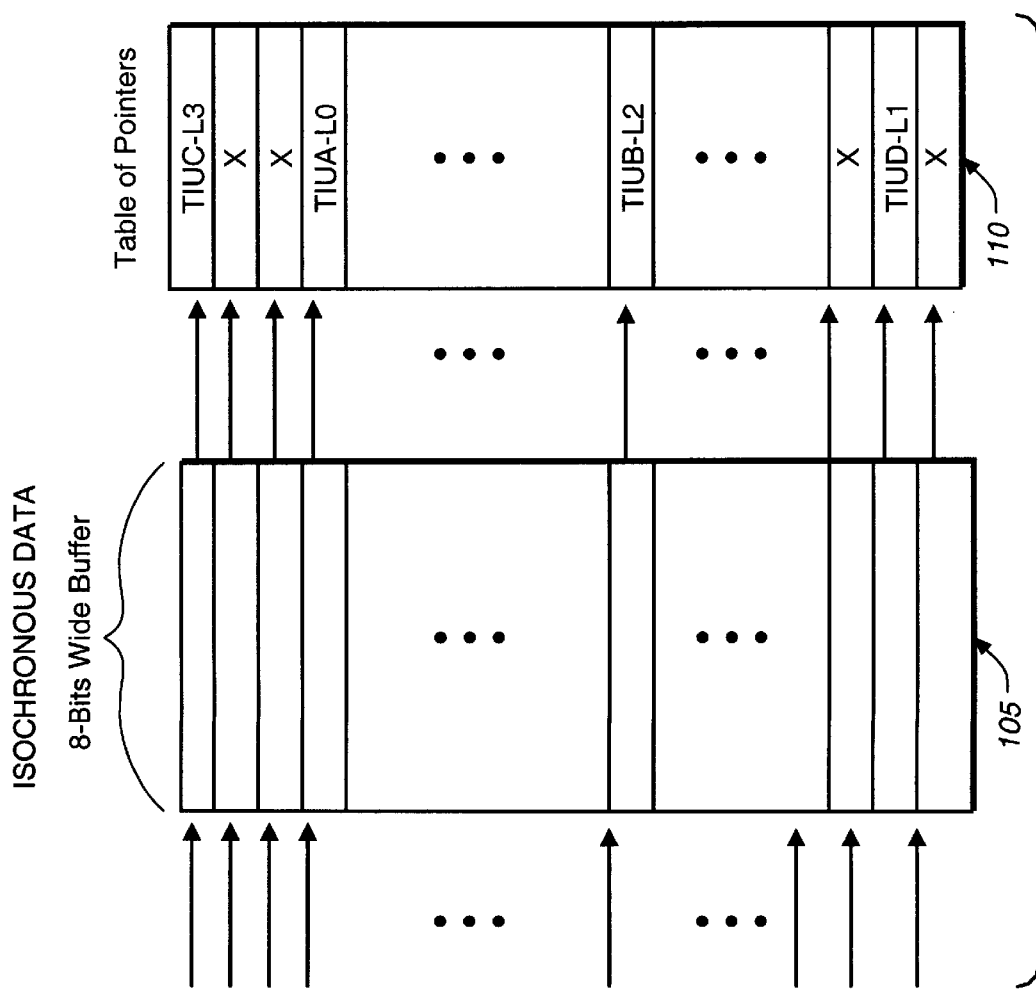
FIG._1

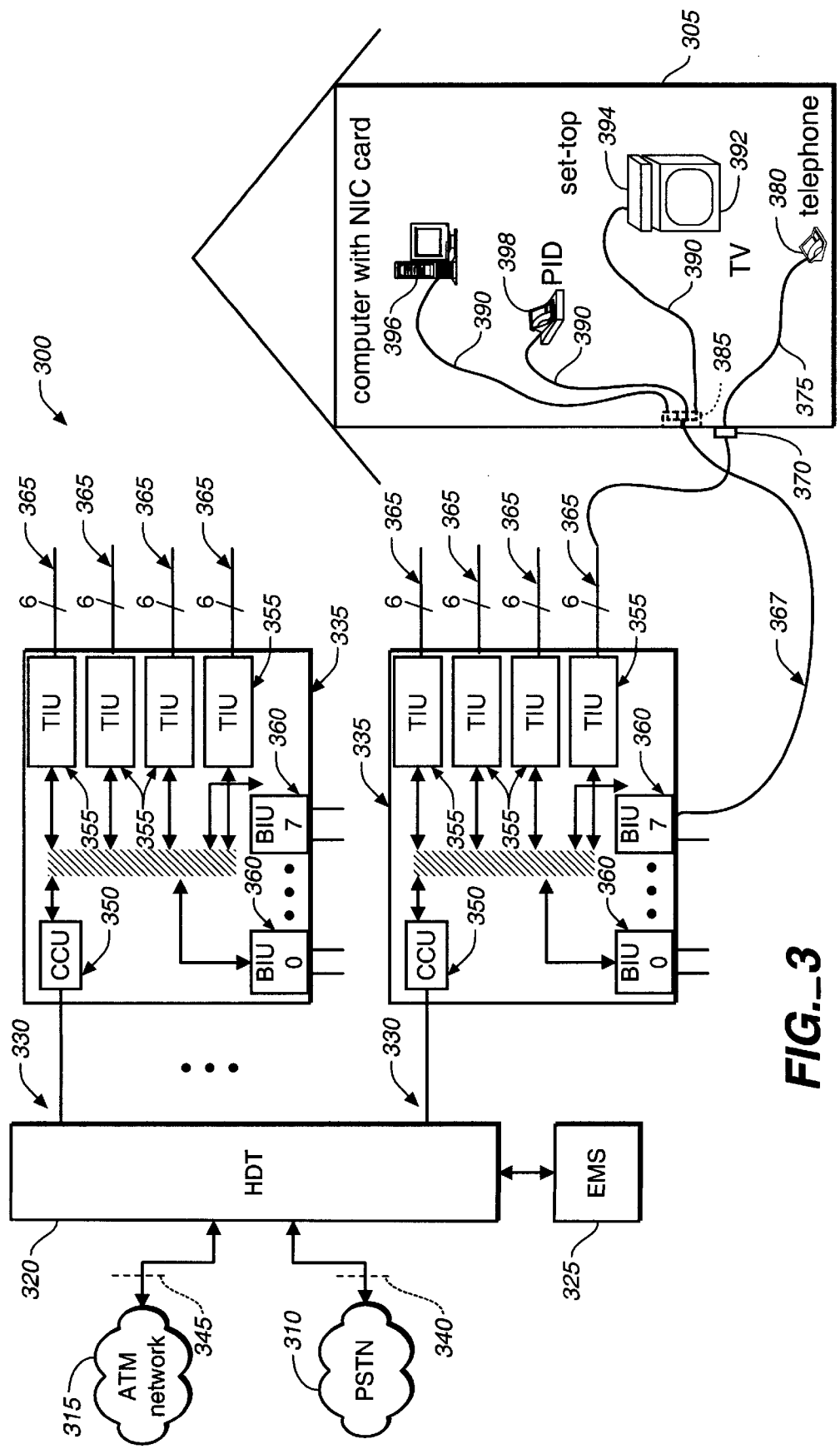
FIG._3

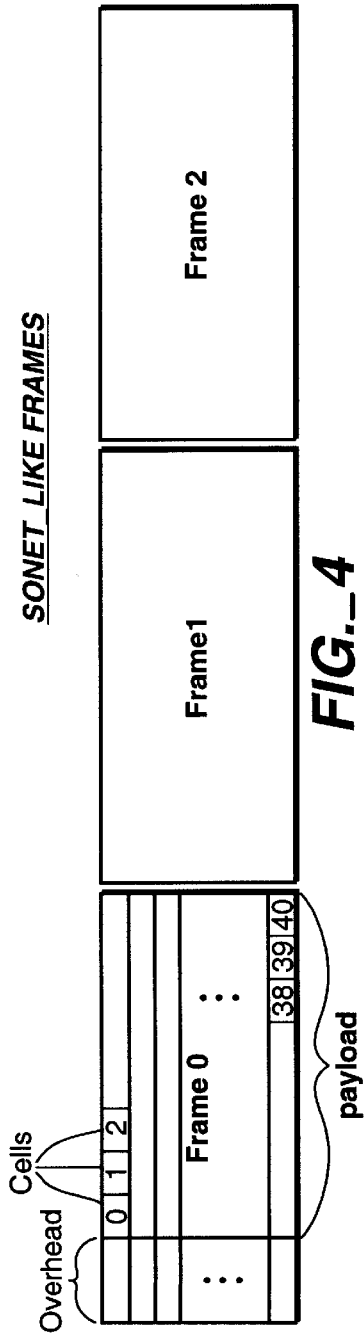
FIG._4
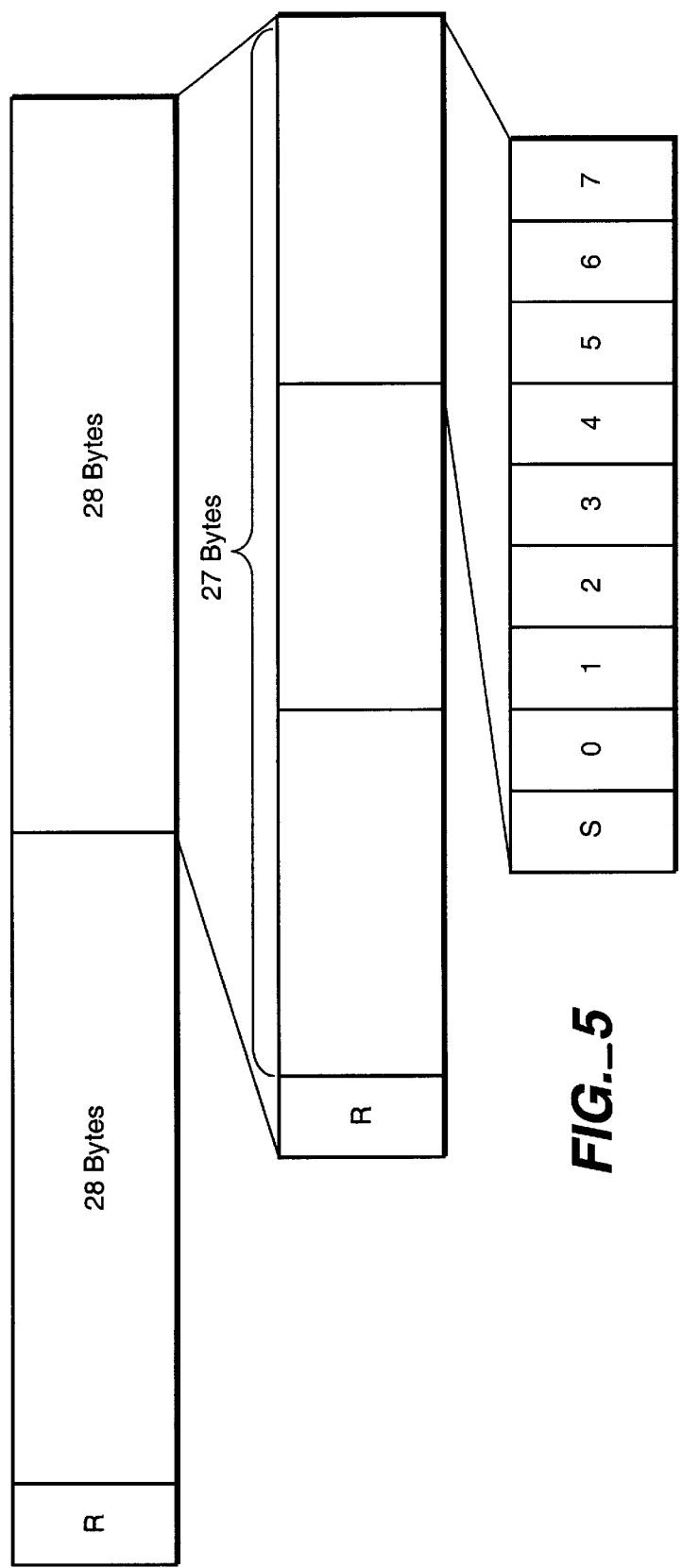
FIG._5

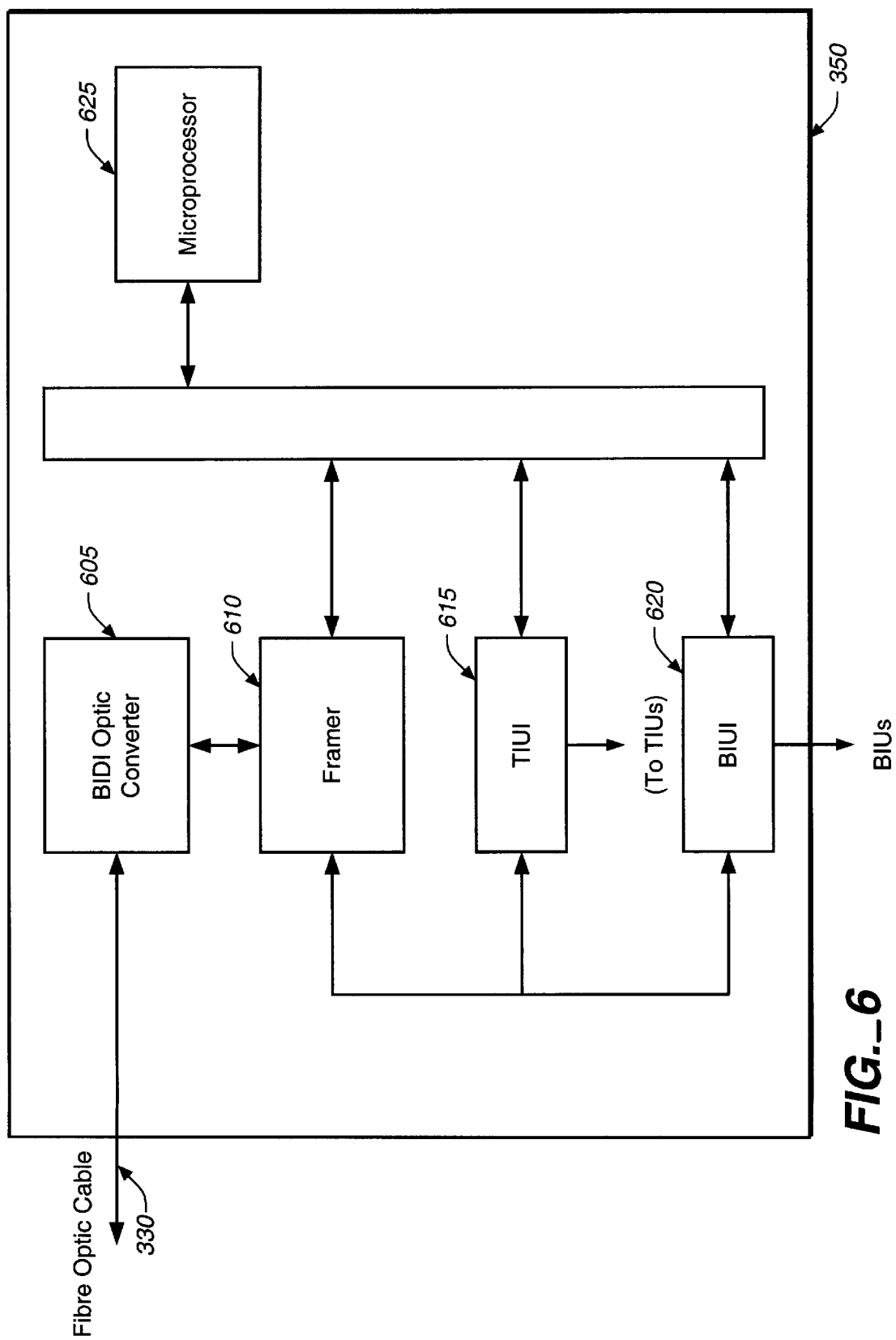
FIG._6

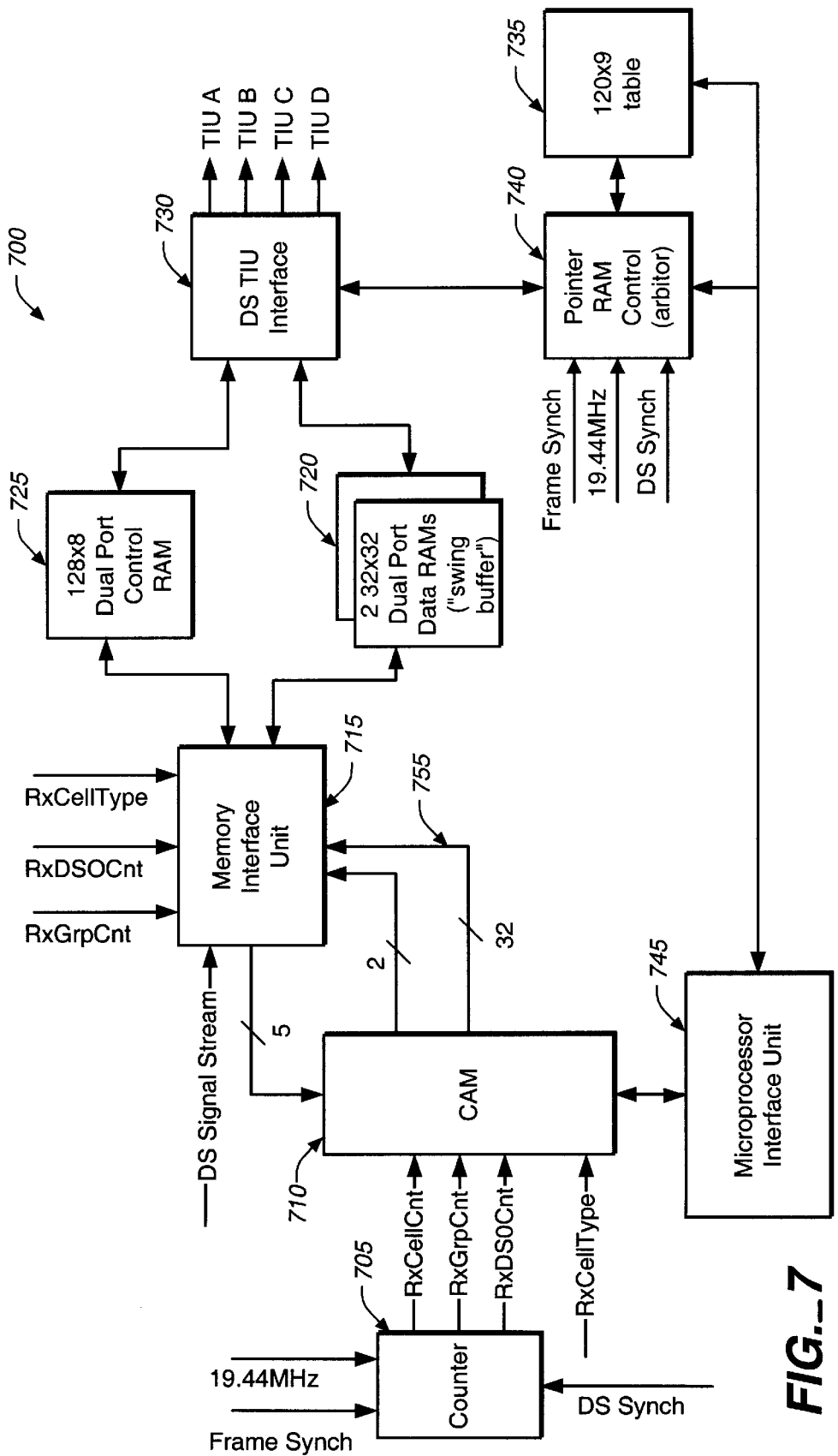
FIG._7

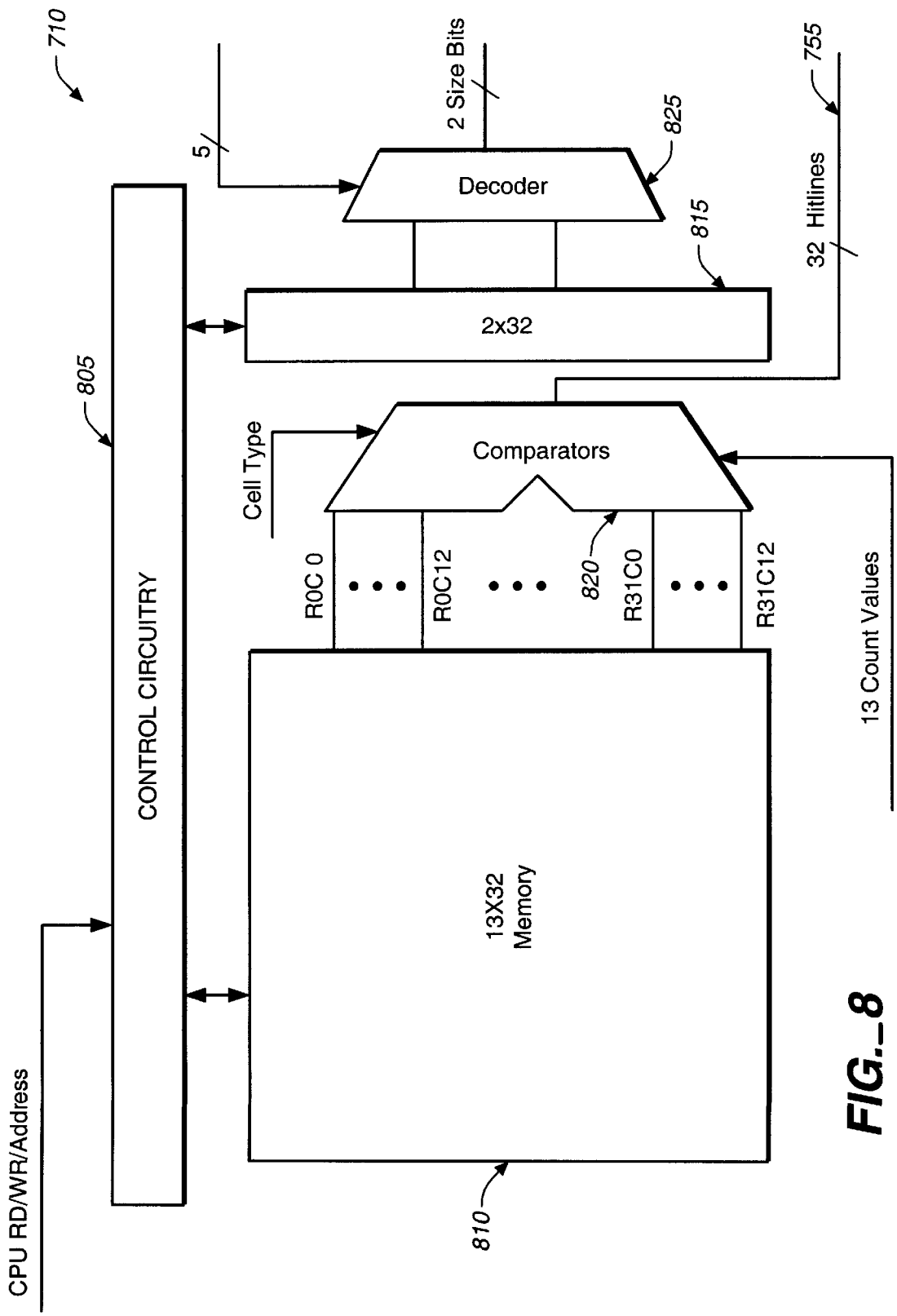
FIG._8

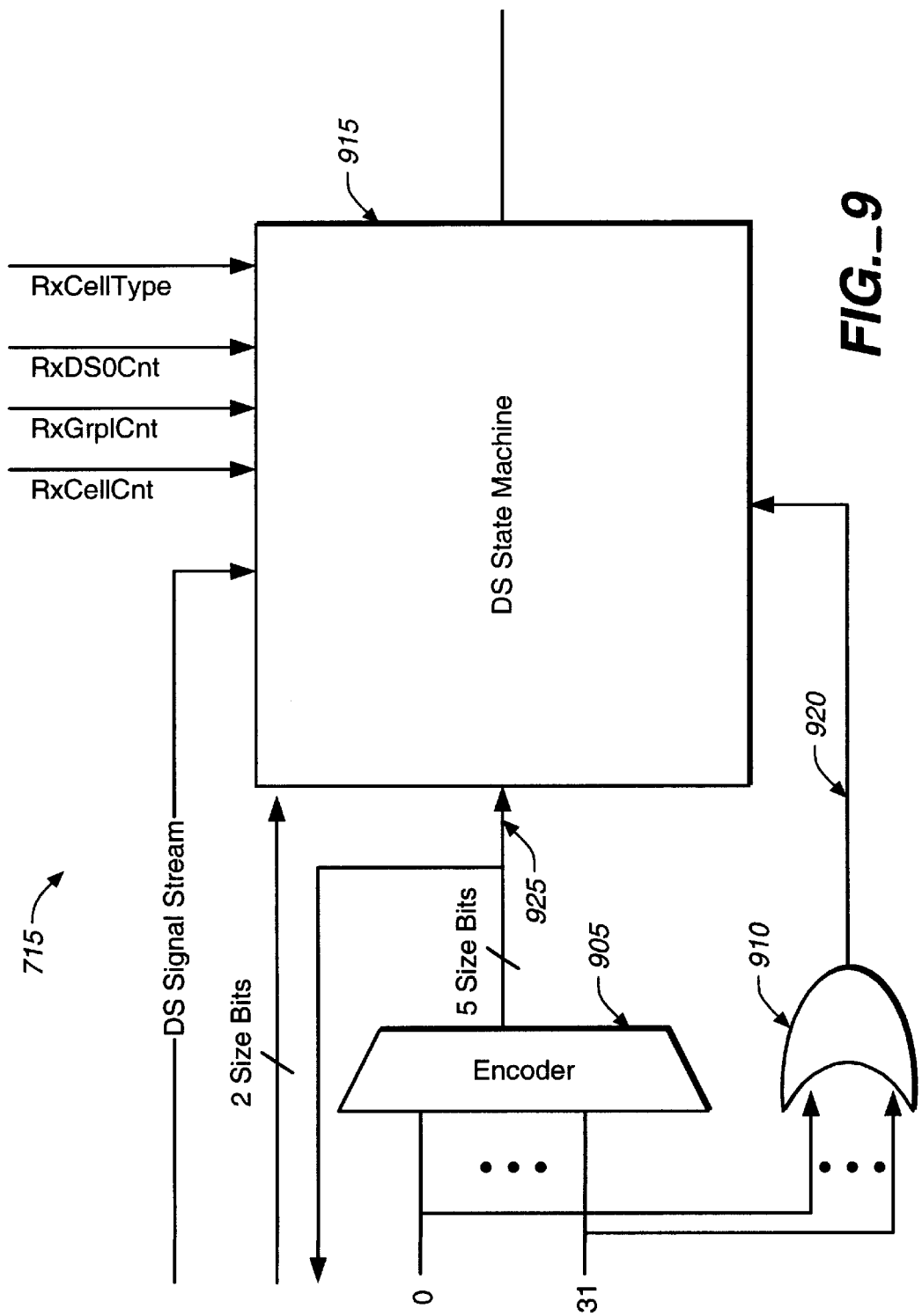

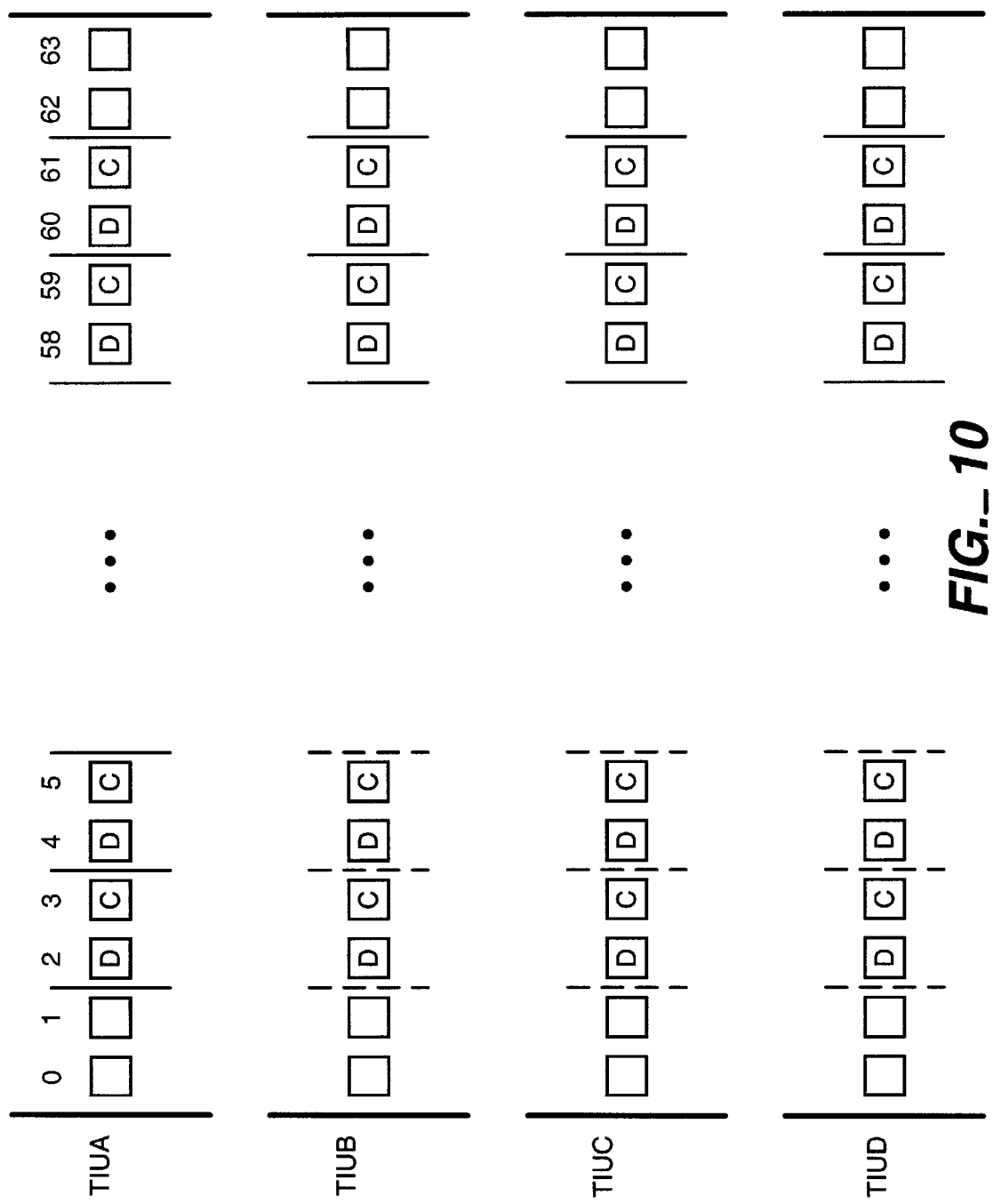
FIG._10

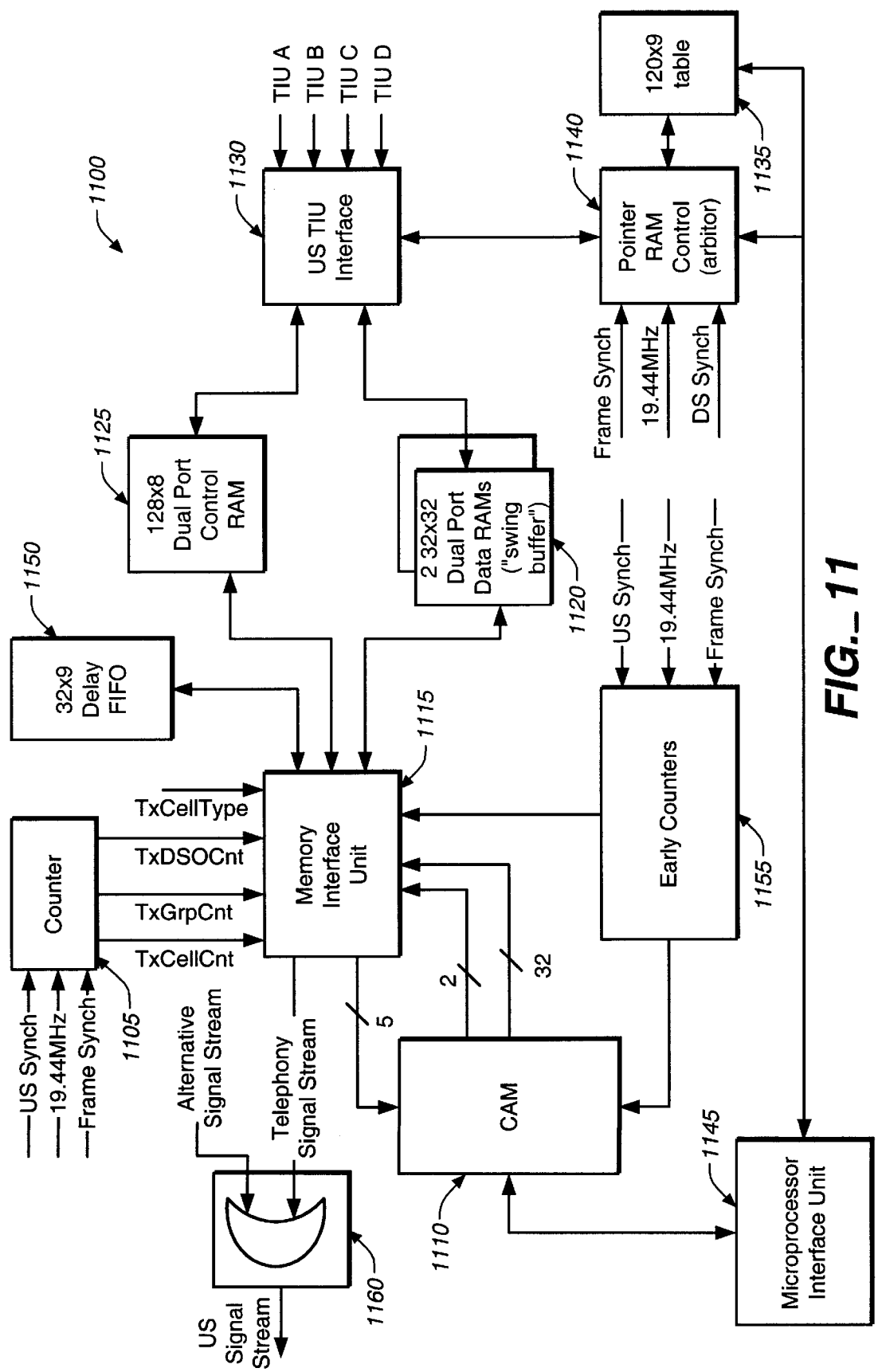
FIG._11

METHOD AND APPARATUS FOR IDENTIFYING SIGNALS FOR A SET OF COMMUNICATION DEVICES IN A SIGNAL STREAM HAVING SIGNALS FOR A NUMBER OF DIFFERENT SETS OF COMMUNICATION DEVICES

RESERVATION OF COPYRIGHT

A portion of the disclosure of this patent document contains material to which a claim of copyright protection is made. The copyright owner has no objection to the facsimile reproduction by anyone of the patent document or the patent disclosure as it appears in the Patent and Trademark Office patent file or records, but reserves all other rights whatsoever.

BACKGROUND OF THE INVENTION

To date, several telecommunication systems have been proposed for carrying signals for different types of communication applications in the same signal stream. Some of these systems integrate signals for narrowband applications (e.g., telephony signals) with signals for broadband applications (e.g., video and data signals) in the signal streams that they transmit. For systems that transmit integrated signal streams in a cell based format, the signal stream can contain a mixture of cells having asynchronous application signals (i.e., signals for asynchronous communication applications) and cells having isochronous application signals (i.e., signals for isochronous applications).

Integrated telecommunication systems, that carry different types of signals for different types of applications, have to properly multiplex and demultiplex the different signals in the signal stream. For instance, some integrated broadband/narrowband systems have to separate the isochronous application signals (e.g., such as telephony signals) from the asynchronous application signals (e.g., video and data signals). A simple prior art method for extracting isochronous telephony signals reads all of the bytes in a received frame into a memory and subsequently determines the isochronous bytes.

FIGS. 1 and 2 set forth one implementation of this prior art technique. As shown in FIG. 1, the prior art includes a memory 105 which sequentially stores every byte of a received frame in contiguous byte-wide memory locations. This prior art implementation also includes a table of pointers 110 with a pointer for each memory location. Each pointer for a memory location that stores telephony bytes points to a specific twisted pair 210 of a specific telephone-interface-unit (TIU) card 205, as set forth in FIG. 2. Hence, once the memory completely stores all bytes of a received frame, the isochronous telephony bytes in the memory are routed to the appropriate telephone lines by traversing the table of pointers.

This prior art technique is inefficient and memory-intensive. For instance, a 155 Mb/s SDH-like data stream having ATM and TDM cells could have 2,340 DS0 bytes. Storing this many data bytes in the memory to extract a relatively few TDM bytes is highly inefficient and memory-intensive.

Consequently, there is a need in the art for method and apparatus that efficiently demultiplex signals for different applications from a signal stream. There is also a need for method and apparatus that efficiently multiplex signals for different applications into a signal stream. More generally, there is a need for method and apparatus that identify signals for a set of communication devices in a signal stream which has signals for a number of different sets of communication devices.

SUMMARY OF THE INVENTION

The invention provides method and apparatus for identifying signals for a set of communication devices in a signal stream having signals for a number of different sets of communication devices. Some embodiments of the invention are methods and devices for extracting signals for a first set of communication devices from a signal stream having signals for a number of different sets of communication devices. Other embodiments of the invention are methods and devices for inserting into a signal stream signals from a first set of communication devices.

Yet other embodiments of the invention are time division multiplexing and demultiplexing methods and apparatuses that use a content addressable memory to identify sets of signals for a particular set of communication devices. In addition, some embodiment of the invention are used in fiber optic telecommunication networks. These embodiments include an optical network unit that receives an integrated signal stream having signals for different types of applications. The optical network unit includes a content addressable memory that stores locations in the received signal stream of signals for a first type of communication application.

BRIEF DESCRIPTION OF THE DRAWINGS

The novel features of the invention are set forth in the appended claims. However, for purpose of explanation, several embodiments of the invention are explained by reference to the following figures.

FIG. 1 presents a memory device and a table of pointers used in one prior art time division demultiplexing technique.

FIG. 2 presents four TIU cards used in conjunction with the memory device and table of pointers of FIG. 1.

FIG. 3 presents a fiber-to-the-curb network in which the invention can be implemented.

FIG. 4 presents one example of a SDH-like frame used in some embodiments of the invention.

FIG. 5 presents one example of a telephony cell used in some embodiments of the invention.

FIG. 6 presents a common control unit for use in the network of FIG. 3.

FIG. 7 presents one embodiment of the invention.

FIG. 8 presents one example of a content addressable memory used in some embodiments of the invention.

FIG. 9 presents one example of a memory interface unit used in some embodiments of the invention.

FIG. 10 illustrates one manner for forwarding extracted telephony data and control bytes to four TIUs in the network of FIG. 3.

FIG. 11 presents another embodiment of the invention.

DETAILED DESCRIPTION OF THE INVENTION

The invention provides method and apparatus for identifying signals for a set of communication devices in a signal stream which has signals for a number of different sets of communication devices. In a communication system, a communication device is a device that transmits and/or receives signals through the communication system. Examples of such communication devices include computers (such as network computers, personal computers, workstations, servers, etc.), television set-top boxes, premises interface device, and telephones.

One or more communication devices form each set of communication devices. A set of communication devices can include similar communication devices (e.g., a set of telephony communication devices can use similar telephony equipment). A set of communication devices can be defined by a number of communication devices that utilize a similar communication medium (e.g., utilize twisted pairs or co-axial cables) to connect to the communication system. In addition, a set of communication devices can be defined by a number of communication devices that utilize similar communication-medium terminating devices (e.g., utilize similar line cards, adapter cards, modems, etc.).

In the following description, numerous details are set forth for purpose of explanation. However, one of ordinary skill in the art would realize that the invention may be practiced without the use of these specific details. In other instances, well-known structures and devices are shown in block diagram form in order not to obscure the description of the invention with unnecessary detail.

Several embodiments of the invention are implemented in fiber-to-the-curb (FTTC) networks. One example of such a network is presented in FIG. 3. As set forth in this figure, the FTTC network 300 connects one or more communication devices at one or more network subscriber site 305 to one or more communication networks, such as a public switched telecommunications network (PSTN) 310, an asynchronous transfer mode (ATM) network 315, or other communication networks. Each network subscriber site 305 can be residential or commercial subscriber sites.

The FTTC network 300 transmits signal streams between the subscriber sites and the PSTN 310, the ATM network 315, or other networks (e.g., individual, private, or non-switched public networks). The signal streams contain signals transmitted to, or received from, a number of sets of communication devices. For one embodiment of the invention, the FTTC network transmits signals to and from telephony communication devices (i.e., telephony application signals) and signals to and from non-telephony communication devices (i.e., non-telephony application signals). For alternative embodiments of the invention, signals for different types of communication devices can be transmitted through the communications network.

The FTTC network 300 includes a host digital terminal (HDT) 320, element management system (EMS) 325, a number of fiber optic cables 330, and a number of optical network units (ONUs) 335. As shown in FIG. 3, the HDT couples to the PSTN, the ATM network, and/or other networks. For one embodiment of the invention, the PSTN-HDT interface 340 follows the specification adopted by one of the standards bodies, such as the Bellcore specification TR-TSY-000008, TR-NWT-000057 or TR-NWT-000303. The physical interface to the PSTN can be twisted pairs carrying DS1 signals, or fiber optic cables carrying OC-3 optical signals.

The ATM network-HDT interface 345 can be realized using an optical interface (such as OC-3, OC-12c, etc.). For one embodiment of the invention, the HDT 320 has two optical broadcast ports, which can only receive signals carrying ATM cells, and one optical interactive port which can receive and transmit signals.

The HDT receives downstream signals from the PSTN, the ATM network, or other networks, and routes these signals downstream to the network subscriber sites. It also receives upstream signals from the network subscriber sites, and routes these signals upstream to the PSTN, the ATM network, or other networks.

On the downstream side of the network, the HDT serves a multiplexor which (1) controls access of the received downstream signals (i.e., the signals it receives from the PSTN, ATM, or other networks) to the transmission media, and (2) transmits the received signals to the appropriate ONUs 335 via the appropriate fiber optic cables 330. Conversely, on the upstream side of the network, the HDT serves as a demultiplexor which (1) parses the received upstream signals (i.e., the signals received from the ONUJs) into signal streams for the PSTN, ATM, or other networks, and (2) supplies these signal streams to the appropriate network.

The HDT also re-formats the downstream and upstream signals, before forwarding them to their destinations. As further described below, the HDT performs the following formatting operations: combining isochronous and asynchronous signals into frames, parsing integrated frames into individual signal streams, adjusting signal rates, and converting of electrical signals to and from optical signals. One of ordinary skill in the art would realize that, in alternative embodiments of the invention, the HDT does not perform all of these formatting operations, or performs additional operations.

In the FTTC network set forth in FIG. 3, the HDT combines (i.e., maps) the received downstream signals into frames containing a mixture of cells having asynchronous application signals (such as data and video signals) and cells having isochronous application signals (such as telephony signals). The HDT transmits these frames to the ONUs at a prespecified rate (e.g., once every 125 $\mu$s). The HDT also parses the received upstream frames into individual bytes supplied to the PSTN, ATM, or other networks.

FIG. 4 presents one example of frames transmitted across the fiber optic cables 330. Each frame shown in this figure is a SDH-like frame which includes overhead and payload envelopes. The payload envelope includes 41 cells of asynchronous and isochronous information. Each cell has 57 bytes.

FIG. 5 presents one example of an isochronous, telephony cell. As shown in this figure, each cell includes three reserved bytes (R), and six groups of DSO bytes. FIG. 5 presents each group as eight DSO data bytes following one signaling byte (S). The signaling byte contains the status and control signals (e.g., on/off hook, ring, etc.) for the eight DSO bytes. Alternatively, each group can include nine clear DSOs bytes containing a mix of information and control signals.

The HDT also adjusts the signal rate of the data it receives. For instance, for some embodiments of the invention, the HDT 320 converts the signals it receives from the PSTN 310 at a DS 1-rate to signals at a DSO-rate; it then transmits these signals to the ONUs in the SDH-like frames. On the upstream side, the HDT performs the inverse signal rate transformation operation. The HDT also converts the electrical representation of the digital signals into an optical representation, and visa versa.

As shown in FIG. 3, the HDT couples to the EMS 325. The EMS is used to provision services and equipment on the FTTC network (e.g., allocate twisted pairs off the TIUs), in the central office where the HDT 320 is located, in the field, or in the residences. The EMS is software based and can run on a personal computer in which case it will support one HDT and the associated access network equipment connected to it. Alternatively, it can run on a workstation in which case it will support multiple HDTs and access networks.

The fiber optic cables 330 communicatively couple the HDT to a number of ONUs 335 located in a number of serviced areas. Some embodiments of the invention use bi-directional, single-mode fiber lines and a dual wavelength transmission scheme to communicate between the ONUs and the HDT. In addition, some embodiments of the invention use sixty four optical fiber cables to connect the HDT to sixty four ONUs.

As shown in FIG. 3, each ONU includes a common control unit (CCU) 350, four telephone interface units (TIU) 355, and eight broadband interface units (BIU) 360. The CCU controls the operation of the ONU. In particular, the CCU performs similar formatting operations as those performed by the HDT.

For instance, the CCU (1) parses the received downstream signals (i.e., the frames it receives from the HDT) into telephony application signal streams and non-telephony application signal streams, and (2) supplies the telephony application signal streams to the appropriate TIU 355. The CCU also combines the signal streams that it receives from the TIUs 355 and BIUs 360 into SDH-like frames (such as the frames discussed above with respect to FIG. 4), which it then transmits to the HDT via fiber optic cable 330. Different embodiments of the invention can be employed in the CCU, in order to allow the CCU to perform the above-described parsing (i.e., demultiplexing) and combining (i.e., multiplexing) operations. Two such embodiments will be described below by reference to FIGS. 7 and 11.

FIG. 6 presents one example of the CCU 350. As shown in this figure, the CCU includes a bi-directional (BIDI) optical converter 605, a framer 610, a TIU interface (TIUI) 615, a BIU interface (BIUI) 620, and a microprocessor 625. On the downstream side, the optical converter 605 converts optical signals, that it receives via a fiber optic cable 330, into a serial, electrical signal stream. The framer 610 then receives this bit-wide electrical signal stream and converts it into a byte-wide signal stream. On the upstream side, the optical converter receives bit-wide, electrical signals from the framer, and converts these electrical signals into optical signals for transmission via the fiber optic cable 330.

The framer also scans the incoming signal stream in order to determine the frame boundary information used to determine the location of payload and overhead bytes. Once the framer determines the frame boundary, it generates a frame synch signal which indicates the start of each frame. As described below, this frame synch signal is used by a number of the circuits of the CCU.

The framer communicatively couples to the TIUI 615, in order to transmit and receive signals from the TIUI. Some embodiments of the invention are implemented in the TIUI, in order to allow the TIUI to parse the telephony application signals from the downstream signal stream, and to combine the telephony application signals into the upstream signal stream. Two such embodiments will be described below by reference to FIGS. 7 and 11.

The framer also transmits signals to and receives signals from the BIUI. The BIUI performs administrative functions (e.g., parity check and overhead addition functions). On the downstream side, the BIUI forwards the signals it receives from the framer to the BIUs 360. Each individual BIU then extracts the portion of the received signals that are addressed to it; the BIU forwards the extracted signals to a network subscriber site 305. On the upstream side, the BIUI 620 acts as an arbitrator for the BIUs. In this capacity, the BIUI allocates different portions of each frame's payload to different BIU's.

The microprocessor 625 of the CCU 350 is used to program various components of the CCU. For instance, as further described below, the microprocessor is used to program various components of the TIUI. Through this programming, the TIUI can store the location of telephony bytes in the received or transmitted signal stream.

As shown in FIG. 3, each ONU 335 includes four TIUs 355 coupled to the TIUI 615 through a backplane interconnect. Each TIU 355 connects to six twisted pairs 365, which thereby allow each ONU to service up to twenty four network subscriber sites. For alternative embodiments of the invention, the FTTC network 300 utilizes ONUs that have different number of TIUs and/or different number of twisted pairs for each TIU.

When a TIU receives a signal stream from the CCU, it converts the signal stream into a signal stream for a narrowband service (such as plain old telephony signals (POTS), coin, ISDN, etc.). For instance, the TIU can generate analog POTS which it transmits to network subscriber site 305 via a twisted pair 365. At the network subscriber site 305, a network interface device (NID) 370 serves as an interface and demarcation point between the twisted pair 365 and subscriber-site twisted pair 375 coupled to telephone 380. The NID provides high-voltage protection. In addition, through the NID 370 and twisted pairs 365 and 375, each TIU 355 receives analog signals from the network subscriber site. It then converts these analog signals into digital signals which it supplies to the CCU.

Each ONU 335 also includes eight BIUs 360 coupled to the CCU 350 through the backplane interconnect. Each BIU 360 connects to two co-axial cables. Alternative number of BIUs and/or co-axial cables could also be used in the ONU. As described above, each BIU communicatively couples to the BIUI 620 of the CCU 350. Through this coupling, the BIU receives signals from the CCU.

The BIU includes a filter which decodes a portion of the overhead bytes of each received cell to determine if the received cell is addressed to its BIU. If so, the filter also determines the addressed co-axial cable of the BIU. The filter then reformats the received cell and stores it in a FIFO queue. As the contents of the FIFO are read out, the BIU modulates the read-out signals onto an RF carrier and transmits the data via the addressed co-axial cable to a splitter 385 at the network subscriber site 305.

Subscriber-site coaxial cables 390 couple the splitter to a number of communication devices at the network subscriber site. These communication devices include a television (TV) 392 with a television set-top 394, computer with a network interface card (NIC) 396, and a premises interface device (PID) 398 connected to a telephone. Each of these devices parses and decodes the received reformatted cells in order to obtain video, data, and voice signals.

In particular, each communication device requires an interface sub-system which provides for the conversion of the signal from the format on the subscriber-site coaxial cable to the service interface required by the device. The PID 398 extracts the voice signals carried on the subscriber-site coaxial cable 390 and generates a telephone signal compatible with the telephone. Similarly, the television set-top 394 converts digital video signals to analog signals compatible with the TV 392. The NIC card generates a computer compatible signal.

Through the subscriber-site coaxial cables 390, the splitter 385, and the coaxial cable 367, the BIU also receives broadband signals for upstream transmission through the FTTC network 300. The BIU demodulates the signals that it receives and combines the resulting components of the broadband signals into a unified broadband signal stream, which it relays to the BIUI 620.

One of ordinary skill in the art would understand that the invention can be implemented in other FTTC networks. For instance, some embodiments of the invention can be implemented in the networks disclosed in United States Application No. entitled "Unified Access Platform," filed on Aug. 4, 1997, concurrently with the present application, having Thomas R. Eames as the inventor, and having the express mail label number EH385539499US. The disclosure of this application is incorporated in the present application by reference. Alternatively, one of ordinary skill in the art would understand that the invention can be implemented in alternative networks.

One embodiment of the invention that is implemented in the FTTC network 300 extracts signals for a set of telephony communication devices from an integrated telephony/non-telephony signal stream transmitted through the FTTC network. This embodiment stores position identifying indicia (e.g., pointers) that identify the locations of telephony application signals in a received signal stream, which as mentioned above, is organized in a SDH-like frame.

It then generates position identifying indicia as it receives a transmitted frame, and simultaneously compares this indicia to more than one of the stored indicia. When the generated indicia matches a stored indicia, the process extracts the telephony signal corresponding to the generated indicia from the received signal stream. This process then generates appropriate routing signals based on the matched stored location, in order to route the extracted set of signals to its set of communication devices.

FIG. 7 sets forth one such embodiment. This apparatus is implemented in the CCU's TIUI 615, and serves as the interface to the TIUs of the ONU 335. This interface constantly receives the SDH-like frames in byte-wide increments at the SDH-like 19.44 MHz. The interface includes a byte counter 705, a content addressable memory 710, a memory interface unit 715, swing data random access memories 720, a control random access memory (RAM) 725, a downstream TIU interface 730, a table of pointers 735, a pointer RAM control 740, a bit counter (not shown), a microprocessor interface unit 745, and a downstream synchronizing unit (not shown).

The counter 705 and content addressable memory (CAM) 710 in conjunction act to identify the telephony application signals in the downstream SDH-like frames forwarded to the memory interface unit 715. Specifically, the counter receives frame synchronizing signal (generated by the framer 610) to maintain its alignment to each frame. The counter also receives a synchronizing signal from the downstream synchronizer (not shown). This synchronizing signal maintains the counters in the SDH-domain and the counters in the telephony-domain in synch, so that the interface units 715 and 730 in these domains do not simultaneously access the memories 720 and 725.

The counter also receives the 19.44 MHz SDH-byte clock to generate three count values that are synchronous with the signals received in byte-wide sets at this frequency. In other words, the counter is a byte counter which generates sets of count values. Each set of count values serves as a pointer that specifies the location of a byte within a frame received by the memory interface unit 715. Each pointer is input to the CAM to determine if the received byte corresponding to the pointer is a telephony application byte.

As mentioned above by reference to FIGS. 4 and 5, some embodiments of the invention are designed to multiplex and demultiplex SDH-like frames with a payload of 41 cells of telephony application signals (e.g., TDM signals) and non-telephony applications signals (e.g., ATM signals). Each telephony cell is composed of 6 groups of 9 bytes. The 9 bytes are arranged as one signaling byte followed by 8 DS0 bytes.

Given this cell structure, the counter generates (1) a cell count value, RxCellCnt, that specifies the cell count of the currently received byte, (2) a group count value, RxGrpCnt, that specifies the group count of the currently received byte, and (3) a DS0 byte count, RxDSOCnt, that specifies the byte count of the currently received byte. In this manner, the three count values serve as pointers that uniquely identify every byte within each of the 41 potential TDM cells.

The behavior of these three counts is shown below.

```
CellCnt:    n-1  |-------------------------------- n -------------------------
GroupCnt:    5   | 7 |------- 0 -------|------- 1 -------|------- 2 -------|
DS0Count:   4|5|6|7|0|1|8|0|1|2|3|4|5|6|7|8|0|1|2|3|4|5|6|7|8|0|1|2|3|4|5|6|7|

CellCnt:    -------------------------------- n ---------------------|--- n+1 -
GrpCnt:     |7|------- 3 -------|------- 4 -------|------- 5 -------| 7 |-- 0-
DS0Count:   |2|8|0|1|2|3|4|5|6|7|8|0|1|2|3|4|5|6|7|8|0|1|2|3|4|5|6|7|0|1|8|0|1|
```

The DS0 number 8 within each group is used as the super-frame, multiplexed signaling byte. Also, within each cell there are three reserved bytes corresponding to group 7 with a DS0 count of 0, 1 or 2.

As shown in FIG. 7, the CAM 710 receives the generated count values (RxCellCnt, RxGrpCnt, and RxDSOCnt) and receives a signal (RxCellType) indicating the type of the received cell. A CAM is a memory device with the ability to compare any set of signals (e.g., a data word) presented to it with all of the CAM contents at once, and report the location in the CAM whose contents match the presented set of signals. In the prior art, CAMs have been used in bridges and routers to compare extracted MAC addresses with stored MAC addresses, in order to determine if received packets are addressed to LANs connected to the bridges or routers.

FIG. 8 presents one example of the CAM 710 that can be used in some embodiments of the invention. As shown in this figure, the CAM includes control circuitry 805, a first memory 810, a second memory 815, downstream comparators 820, and decoder 825. Although this figure presents two memories, one of ordinary skill in the art would appreciate that this presentation is simply a pictorial representation of the CAM in order to facilitate its description, and that these two memories could be part of a single memory array.

Through microprocessor interface unit 745 and the control circuitry 805, the first and second memories couple to the microprocessor 625 to receive respectively data signals (i.e., position identifying indicia) and control signals (e.g., block size indicia) for storing. Specifically, through this coupling, the first memory 810 receives and stores up to thirty two position identifying indicia that identify the position of thirty two telephony-application bytes in each SDH-like frame.

In some embodiments of the invention, the first memory stores thirty position identifying indicia, where each position identifying indicia is a pointer that specifies the location of a telephony-application byte within each frame received by memory interface unit. When the frames have a structure as shown in FIG. 4, and the telephony cells have structures as shown in FIG. 5, each stored pointer can have thirteen bits. Of these bits, six bits identify the cell value, three bits identify the group value, and four bits identify the byte value.

In the second memory 815, the microprocessor stores control bits that determine the size of the blocks of signals extracted from the signal stream. In some embodiments of the invention, the second memory stores thirty two sets of control bits, so that there is one set of control bits for each pointer in the first memory. Each set of control bits includes two bits. When a received byte has its location in the received frame match one of the stored pointers in the first memory, the memory interface unit decodes the two control bits corresponding to the matched pointer in order to determine whether it needs to extract one to three bytes following the received byte in the received signal stream in addition to extracting the received byte.

As mentioned above, the CAM also includes thirty-two comparators 820. Each comparator compares a particular thirteen-bit pointer stored in the first memory with the thirteen-bit output of the byte counter 705. For instance, the comparator for the nth row in the first memory array receives the bits stored in row n (Rn) from columns 0 to 12 (C0 and C12), and compares these bits to the generated thirteen count bits RxCellCnt, RxGrpCnt, and RxDSOCnt.

Each comparator includes thirteen X-NOR gates, with each X-NOR gate receiving one bit of the stored pointer and one bit of the generated count value. Each comparator also has an AND gate (not shown) which receives the outputs of the thirteen X-NOR gates of the comparator. The output of each AND gate then represents the output of the comparator. Hence, the thirty two comparators 820 have thirty two output lines. When a received byte's location matches a stored pointer, the pointer's comparator indicates a hit (i.e., a match) by pulling its output line high. One of ordinary skill in the art would understand that alternative CAM structures are used in alternative embodiments of the invention.

As further described below, the memory interface unit 715 receives the thirty two bit output of the comparators 820. This interface unit includes a priority encoder which receives this thirty two bit output to generate a five bit output to represent the address of the row storing the matched pointer in the first memory. The row address for the matched pointer is the same as the row address for its corresponding pair of control signals in the second memory. Hence, the five bit address is supplied to the decoder 825 of the second memory. This decoder then latches and outputs the two control bits stored at the row identified by the received address signal. The memory interface unit then receives these two bits, which, as described later, direct the interface unit to extract up to three bytes that follow the received byte.

The CAM also receives the CellType signal (such as RxCellType or TxCellType). This signal indicates whether the cell that is currently being received in the received frame is a telephony cell or a non-telephony cell. To generate this signal, the CCU includes a memory (not shown) with forty one registers for the forty one cells in the frame payload. Each register stores a CellType flag that indicates whether its corresponding cell is a telephony cell. By using the cell count address generated by the counter 705, the CCU sequentially reads the forty one registers to generate the CellType signal. When the cell is not a telephony cell, the value of the CellType signal powers down the comparators 820.

As mentioned above, the memory interface unit 715 of FIG. 7. This interface unit receives the downstream signal stream. It also receives the generated count values RxGrpCnt and RxDSOCnt, and the RxCellType, in order to synchronously operate with the CAM. It couples to the CAM 710 to receive its thirty-two bit output. Based on this output, it generates the five bit address of the matched pointer in the CAM. The interface unit then uses this address to retrieve the two control bits corresponding to the matched pointer from the CAM. Based on the two control bits, as well as the thirty two output bits of the CAM, the interface unit extracts one to four telephony bytes from the received signal stream, and generates address and control signals to store the extracted telephony bytes in data and control RAMs 725 and 730.

FIG. 9 presents one example of the memory interface unit 715. This embodiment includes a priority encoder 905, an OR gate 910, and a downstream (DS) state machine 915. Priority encoder 905 receives the thirty two bit output of the CAM. As the CAM does not store identical pointers, only one of the thirty two output lines should be active when a telephony signal is received. If the CAM reports multiple hits on its thirty two output lines (i.e., if more than one line is active), it is determined that the CAM was improperly programmed, and an error condition is reported through an interrupt structure or a status flag.

When one of the thirty two output lines 755 are active, the priority encoder generates a five bit address based on the values of the active line. This address is sent back to the CAM in order to retrieve two control bits which are stored in the second memory at the generated row address. These two bit are then supplied to the DS state machine.

The state machine also receives an enable signal 920, as well as the five-bit output of the encoder. The enable signal is the output of the OR gate 910, which receives as its input the thirty two output lines of the CAM. When one of these lines is active, the OR gate output is also active. This active signal causes the DS state machine to extract from the downstream signal stream the byte that it is receiving at that time. By decoding the two control bits, the DS state machine then determines whether it needs to extract up to three other bytes that follow the initial, extracted byte.

Based on the value of the generated five bit address and the two control bits, the state machine 915 generates address and control signals to store the extracted bytes in the data and control RAMs 720 and 725. For some embodiments of the invention, the relationship between the pointers stored in the CAM and the storage locations in RAMs 720 and 725 (for storing extracted bytes whose locations in the signal stream matched the stored pointers) is hard coded. This hard coded relationship allows the downstream state machine to simply use the five bit row address 925 of the matched pointers to generate the address signals for the locations in the RAMs 720 and 725 for storing the extracted bytes.

In some embodiments of the invention, the memory interface unit is designed by using a hardware design language. For such embodiments, one possible design of the memory interface unit is set forth in Appendix A. This design uses the Verilog hardware design language. Numerous manufacturers of logic synthesizers (such as Synopsys, Viewlogic, Synplicity, ACEO, Cascade Design Automation, Exemplar, and Altera) can transform the logic in this code to gates, and thereby obtain the gate level implementation for the memory interface unit.

The memory interface unit extracts either telephony data signals or telephony control signals from the frame. The two signal types are treated differently in the way they are stored. The control signals are written to control RAM 725, whereas the data signals are written to data RAM 720. In some embodiments of the invention, the control RAM is a 128×8, dual port RAM, while the data RAM is formed by two 32×32, dual port RAMs that act as a "swing" buffer ("ping-pong" buffer).

RAMs 720 and 725 are where the telephony data and control signals cross from the 19 MHz, SDH-like time domain into the 4 MHz, telephony domain (e.g., POTS domain). Two RAMs are used to form the "swing" buffer for the telephony data signals. The "swing" buffer has two memory areas so the 19 MHz domain can write the data for one frame, while the 4 MHz domain can read the data for the previous frame. The memory interface unit 715 determines which of the "swing" RAMs to store the telephony data signals in the current frame, based on a frame count generated by a frame counter (not shown).

The control signals do not require more than one RAM to cross the 19 MHz-4 MHz boundary. This is because the frequency of the control signals is slow enough that both the 19 MHz and the 4 MHz domains can access the RAM before the next signaling byte will appear in the SDH frame. Also, a slight degree of imprecision can be tolerated with respect to the control signals, as such imprecision will hardly be noticed by the users. The 4 MHz side is given priority over the 19 MHz side in the accessing of this control signal RAM.

Once the ONU has completely received a frame, the counter 705 and the CAM 710 have checked the location of each received byte, and the memory interface unit 715 has extracted and stored all the telephony data and control signals of the frame in the data and control RAMs, the pointer RAM control 740, the table of pointers 735, and the DS TIU interface 730 direct the telephony signals in RAMs 720 and 725 to the appropriate TIUs. In other words, the pointer RAM control 740, the table of pointers 735, and the DS TIU interface 730 act as a cross connect structure that determines which data and control is forwarded to which TIU.

As shown in FIG. 7, the DS TIU interface 730 couples to four TIUs A, B, C, and D. This interface also couples to the pointer control 740 to receive addresses of locations in the data and control RAMs that it needs to read. The pointer control retrieves these addresses from the pointer table 735. The pointer table couples to the microprocessor 625 through the pointer control 740 and the microprocessor interface unit 745, in order to receive and store address signals from the microprocessor during a program mode.

The pointer control 740 serves as an arbitor which controls access to the table 735. The pointer control receives the 4.096 MHz clock signal, the frame synch signal, and the DS synch signal. A bit counter (not shown) of this pointer control receives the 4 MHz clock signal to generate a nine-bit count at this frequency. The control unit receives the frame synch signal (generated by the framer 610) to maintain its alignment to each frame. The control unit 740 receives the DS synch signal from the downstream synchronizer (not shown), in order to synchronize its counter with the SDH-domain counters so that the interface units 715 and 730 do not simultaneously access the memories 720 and 725.

The top six bits of the nine-bit count produced by the pointer control's counter serves as a byte counter that counts sixty four bytes for each received frame. These sixty four count values define sixty four time slots during which the pointer control 740 (1) causes the pointer table 735 to generate 256 addresses in the RAMs 720 and 725, and (2) supplies these 256 addresses to the DS TIU interface 730.

In particular, during each of the sixty four time slots, the pointer RAM control directs the table 735 to output in a particular sequence the contents of four of its nine-bit wide storage locations. Each nine-bit wide storage location of the table 735 includes seven bits for defining a row address, one bit for selecting the control RAM, and one bit for selecting the data RAM. In turn, during each of the sixty four time slots, the TIU interface 730 reads the RAMs at each of the four addresses output by the table. The TIU interface then forwards the four sets of retrieved signals to the four TIUs A, B, C, and D.

FIG. 10 illustrates this read out operation pictorially for one embodiment of the invention which stores 120 telephony data bytes in each data RAM 720, and stores 120 telephony control bytes in the control RAM 725. During the first two time slots and the last two time slots, the DS TIU interface reads out overhead bytes (e.g., parity bytes). During the remaining sixty time slots, four sets of thirty telephony data bytes (D), and four sets of thirty telephony control bytes (C) are respectively read out of the data RAMs 720 and the control RAM 725. Each TIU 355 receives one set of telephony data bytes and one set of telephony control bytes. For the operation illustrated in FIG. 10, the pointer RAM control 740 alternatively reads out telephony data bytes and telephony control bytes for each TIU.

Data and control signal fetching are done for each of the TIU in a particular order. During each of the middle sixty time slots, the DS TIU interface 730 retrieves four telephony bytes, The first three bytes for three TIUs are stored in intermediate registers. When the fourth byte is fetched, all four bytes are written to shift registers. These bytes are then shifted out to the TIUs one bit at a time based on the value of the pointer control's bit counter. While the bytes in the shift registers are being shifted out, the next four telephony bytes are fetched.

In some embodiments of the invention, the DS TIU interface 730 and the pointer control 740 are designed and manufactured by using a hardware design language. For such embodiments, one possible design for the DS TIU interface unit is set forth in Appendix B, while one possible design for the pointer control 740 is set forth in Appendix C. These designs use the Verilog hardware design language. Numerous manufacturers of logic synthesizers (such as Synopsys, Viewlogic, Synplicity, ACEO, Cascade Design Automation, Exemplar, and Altera) can transform the logic in this code to gates, and thereby obtain the gate level implementation for the DS TIU interface.

Another embodiment of the invention that is implemented in the FTTC network 300 multiplexes telephony application signals and non-telephony application signals to form an integrated telephony/non-telephony signal stream for transmission to the HDT 320 through the FTTC network. This embodiment stores position identifying indicia (e.g., pointers) that identify the appropriate location of the telephony signals in a signal stream, which as mentioned above is organized in a SDH-like frame. It then generates position identifying indicia as it receives signals for transmission, and compares the indicia to the stored indicia. When generated indicia matches stored indicia, it inserts the telephony signal corresponding to the generated indicia in the signal stream.

FIG. 11 sets forth one such embodiment of the invention. This embodiment multiplexes telephony signals and non-telephony signals to form an integrated telephony/non-telephony signal stream for transmission to the HDT 320 through the FTTC network. The interface apparatus 1100 constantly receives four telephony data streams (e.g., four DS0 streams) from four TIUs A, B, C, and D. It multiplexes these streams with another signal stream to form a byte-wide stream supplied to the framer.

Like the apparatus 700 of FIG. 7, the apparatus 1100 of FIG. 11 can be implemented in the CCU's TIUI, which serves as the interface between the TIUs and the fiber optic cables. Also, like apparatus 700, this apparatus has a byte counter 1105, a CAM 1100, a memory interface unit 1115, two dual port data RAMs 1120, a dual port control RAM 1125, an upstream (US) TIU interface 1130, a table 1135, a pointer control 1140, and a microprocessor interface unit 1145. However, it also includes a delay FIFO 1150, an early counter 1155, and a set of eight OR gates 1160.

The operation of the apparatus 1100 is similar to the operation of the apparatus 700, except that it is in the reverse order and it has a built in delay. For instance, like the pointer control 740, the table 735, and the DS TIU interface 730, the pointer control 1140, the table 1135, and the US TIU interface 1130 act as a cross connect structure. However, unlike these structures of apparatus 700, the pointer control 1140, the table 1135, and the US TIU interface 1130 forward the signals coming from the TIUs to the RAMs 1120 and 1125.

As shown in FIG. 11, the US TIU interface 1130 couples to TIUs A, B, C, and D to receive telephony data and control bytes. This interface also couples to the table 1135 via the control unit 1140 to receive addresses of locations in the data and control RAMs 1120 and 1125, in which it can store the received telephony bytes. The table 1135 couples to the microprocessor 625 through the control unit 1140 and the microprocessor interface unit 1145, in order to receive and store address signals from the microprocessor during a program mode.

The table 1135 is controlled by the pointer control 1140, which includes a bit counter (not shown). This control unit receives the 4.096 MHz clock signal, the frame synch signal, and the US synch signal. The control unit's bit counter receives the 4.096 MHz clock signal to generate a nine-bit count at this frequency. The control unit receives the frame synch signal (generated by the framer 610) to maintain its alignment to each frame. The control unit 1140 receives the US synch signal from the downstream synchronizer (not shown), in order to synchronize its counter with the SDH-domain counters so that the interface units 1115 and 1130 do not simultaneously access the memories 1120 and 1125.

The top six bits of the nine-bit count produced by the pointer control's counter serves as a counter that counts sixty four time slots for each transmitted frame. During these sixty four time slots the pointer control 1140 (1) causes the pointer table 1135 to output 256 addresses in the RAMs 1120 and 1125, and (2) supplies these addresses to the US TIU interface 1130. The US TIU interface then uses these 256 addresses to store 256 bytes from the TIUs 355 in the RAM 1120 and 1125.

More particularly, during each of the sixty four time slots, the US TIU 1130 receives and stores up to four telephony bytes from the four TIUs A, B, C, and D. Also, during each time slot, the pointer RAM control 1140 directs the table 1135 to output four of its nine-bit wide storage locations. Each nine-bit wide storage location in the table 1135 includes seven bits for defining a row address, one bit for selecting the control RAM, and one bit for selecting the data RAM. The US TIU interface then uses the nine-bit outputs of the table to store its four telephony bytes in the RAMs 1120 and 1125.

As mentioned above, in some embodiments of the invention, the pointer RAM control 740 is designed and manufactured by using a hardware design language; one example of such a design is set forth in Appendix C. Also, in some embodiments of the invention, the US TIU interface 1130 is designed and manufactured by using a hardware design language. For such embodiments, one possible design of the US TIU interface is set forth in Appendix D. This design uses the Verilog hardware design language. Numerous manufacturers of logic synthesizers (such as Synopsys, Viewlogic, Synplicity, ACEO, Cascade Design Automation, Exemplar, and Altera) can transform the logic in this code to gates, and thereby obtain the gate level implementation for the US TIU interface.

The memory interface unit 1115 also accesses the data and control RAMs 1120 and 1125. However, unlike the US TIU interface 1130 which couples to the 4.096 MHz ports of these RAMs, the memory interface unit 1115 couples to the 19.44 MHz ports of these RAMs. As shown in FIG. 11, the memory interface unit also couples to the CAM 1110, the early counter 1155, the counter 1105, and the delay FIFO 1150, in order to read the telephony bytes from the RAMs and timely output these bytes in a signal stream for transmission.

Specifically, the early counter 1155 cause memory interface unit to read out the telephony signals from the RAMs and to store them in the delay FIFO 1150. The count values generated by the early counter are a predetermined number of bytes (e.g., twenty four) ahead of the count values generated by the counter 1105. The early counter 1155 generates count values which identify the locations (or time slots or time periods) in the frame for transmission.

These count values are supplied to the CAM 1110. One example of this CAM is depicted in FIG. 8, which was discussed above. The CAM 1110 can store up to thirty two pointer in a first memory, where each pointer specifies the location of a telephony-application byte within each frame for transmission. The CAM also stores two control bits for each pointer in a second memory.

Once the CAM receives a count value from the early counter, it simultaneously compares the count value with all of its pointers. If the generated count value matches one of the CAM's stored pointers, the CAM outputs a hit signal on the output line for its matched pointer.

The memory interface unit 1115 receives the thirty two output lines of the CAM. When the CAM outputs a hit signal, the memory interface unit (like the memory interface unit 715 of apparatus 700) uses a priority encoder to encode the signal on the thirty two output lines into a five bit output. This five bit output represents the address of the row storing the matched pointer. This output is feedback to the CAM in order to read out the pair of control signals corresponding to the matched pointer. The memory interface unit then receives these two bits.

For some embodiments of the invention, the relationship between the pointers stored in the CAM 710 and the storage locations in RAMs 1120 and 1125 is hard coded. This hard coded relationship allows the memory interface unit to use the matched pointer's row address plus the retrieved two control bits to extract one to four bytes from the RAMs 1120 and 1125. In some embodiments of the invention, the memory interface unit 1115 is designed and manufactured by using a hardware design language. For such embodiments, one possible design of the memory interface unit is set forth in Appendix E. This design uses the Verilog hardware design language. Numerous manufacturers of logic synthesizers (such as Synopsys, Viewlogic, Synplicity, ACEO, Cascade Design Automation, Exemplar, and Altera) can transform the logic in this code to gates, and thereby obtain the gate level implementation for the memory interface unit 1115.

The memory interface unit stores the extracted telephony data bytes in the delay FIFO 1150, while it stores some of the extracted telephony control bytes in a circular buffer. As mentioned above, the early counter is a predetermined number of bytes (e.g., twenty four) ahead of the byte counter 1105. Hence, the early counter causes the memory interface unit to extract each telephony byte from the RAMs a number of cycles before it needs to output the byte.

The memory interface unit uses the delay FIFO 1150 to store the extracted telephony data bytes. The delay FIFO stores thirty two sets of nine bits. The memory interface unit can store a telephony data byte in eight bits of each set. The ninth bit indicates whether the set contains telephony data bytes. Each time the early counter generates a count value, the memory interface unit (1) reads out the set of bits that was input first, and (2) can store a telephony data byte in the FIFO. Also, each time the early counter generates a new count value, the contents in each nine bit register in the FIFO are advanced one stage.

The early counters and the delay FIFO allow the memory interface unit to perform a "look ahead" function, in order to identify the telephony data bytes that will surface in a few clock cycles. By identifying the telephony data bytes slightly ahead of time, the memory interface unit can combine in proper order the telephony control bytes and the telephony data bytes, as depicted in FIG. 5. In other words, this early hit detection will allow the data and control bytes to be fetched and merged into the SDH frame at the proper time.

The memory interface unit stores the extracted telephony control bytes in a circular buffer. For some embodiments of the invention, a three byte circular buffer is used by the memory interface unit. In these embodiments, this unit uses a frame count generated by the frame counter (not shown) to selectively store in the circular buffer one of the eight possible telephony control bytes that are to be placed in front of the sets of eight telephony data bytes in nine-byte groups of the transmitted cells.

The memory interface unit reads out the contents of the delay RAM and the circular buffer under the control of the early counter 1155 or the counter 1105. The memory interface supplies each retrieved byte to input of OR gates 1160. The OR gates receive the output of the memory interface unit or another signal stream, but not both simultaneously. These gates then output the signals they receive onto line 1165, which couples to the framer 610.

As apparent from the discussion above, the invention is advantageous because it provides method and apparatus that efficiently demultiplexes signals for different communication applications (such as telephony applications and non-telephony applications) from a signal stream. The invention also provides method and apparatus that efficiently multiplexes signals for different applications into a signal stream.

As described above, some embodiments of the invention efficiently perform the demultiplexing operation by using a CAM to quickly verify whether a set of signals are for a particular type of communication application. If so, these embodiments extract these sets of signals from the signal stream. This demultiplexing operation obviates the need for storing all the received sets of signals, prior to determining which sets of signals need to be routed to the particular communication applications. Some embodiments of the invention also efficiently perform the multiplexing operation by using a CAM to quickly identify appropriate locations in a signal stream.

While the invention has been described with reference to numerous specific details, one of ordinary skill in the art would recognize that the invention can be embodied in other specific forms without departing from the spirit of the invention. Thus, one of ordinary skill in the art would understand that the invention is not to be limited by the foregoing illustrative details, but rather is to be defined by the appended claims.

APPENDIX A

```verilog
// tdsrmictl.v :    Down-stream RAM input control
//
//
// Functional desription:
//
//
// synthesis constraints
//
// sc   clklist = (Clk19)
// sc   create_clock Clk19 -period 40 -waveform (0 20)
// sc   set_clock_skew -uncertainty 3 clklist
// sc   set_fix_hold Clklist
// sc   set_false_path -from (iRESET_)
// sc   set_dont_touch_network Clklist
// sc   set_load 2 DsClk19b
// module tdsrmictl
  (
   iRESET_,
   Clk19,
   DsClk19b,
   tRxSOH,
   tRxCelltype,
   RxD,
   RxSFCnt,
   RxGrpCnt,
   RxDS0Cnt,
   RxPcmHit,
   StBlkSz0,
   StBlkSz1,
   DnPDIn,
   DnPWAdd,
   DnPWe,
   DnSigIn,
   DnSigWAdd,
   DnSigWe,
   DnSigWrBlk,
   CAMErr
   );

input         iRESET_;
input         Clk19;
input  [7:0]  RxD;
input         tRxCelltype;
input         tRxSOH;                  //Down-stream SONET frame data
input  [2:0]  RxSFCnt;                 //Down-stream cell type
input  [2:0]  RxGrpCnt;                //Down-stream SONET overhead enable
                                       //Down-stream super frame count
                                       //POTS group number within the current
input  [3:0]  RxDS0Cnt;                //down-stream TDM cell
                                       //DS0 number within the current
                                       //Down-stream POTS group
input  [31:0] RxPcmHit;                //Down-stream hit signals from CAM
input  [31:0] StBlkSz0;                //Bit 0 of all stored CAM block size counts
input  [31:0] StBlkSz1;                //Bit 1 of all stored CAM block size counts
                                       //
output [31:0] DsClk19b;                //
output [5:0]  DnPDIn;                  //Down-stream PCM RAM Data-In
output        DnPWAdd;                 //Down-stream PCM RAM Address-In
output        DnPWe;                   //Down-stream PCM RAM Write Enable
output [7:0]  DnSigIn;                 //Down-stream Signalling RAM Data-In
output [6:0]  DnSigWAdd;               //Down-stream Signalling RAM Wr Address output        DnSigWe;                 //Down-stream Signalling RAM Wr Enable
output        CAMErr;                  //

// local declarations wire   [1:0]  BlkSz;
wire   [31:0] RxPcmHit;                //
wire          BlkCntr0;                //
wire          BlkSz0;                  //
wire          Busy;                    //
wire          ErrOvrLp;                //
reg           We0DnPDIn;               //
reg           We1DnPDIn;               //
reg           We2DnPDIn;               //
reg    [31:0] We3DnPDIn;               //
reg           DnPDIn;                  //
reg    [4:0]  HitAdd;                  //
reg           Hit;                     //
reg           ErrMulHit;               //
reg           ErrMulHitFlg;            //
reg    [4:0]  StHitAdd;                //
reg    [5:0]  DnPWAdd;                 //
reg    [1:0]  StBlkSz;                 //
reg           dtRxSOH;                 //
reg    [7:0]  dRxD;                    //
reg    [1:0]  BlkCntr;                 //
reg    [1:0]  nBlkCntr;                //
reg           DnPWe;                   //
reg           ValidGrp;                //
reg           SigFlg;                  //
integer       i;                       //
reg    [3:0]  dRxDS0Cnt;               //
reg    [7:0]  SigByte;                 //
reg    [7:0]  DnSigIn;                 //
reg    [6:0]  DnSigWAdd;               //
reg           CAMErr;                  //
wire          TdmCell;                 //
wire          pValidGrp;               //
wire          SigHit;                  //
wire          SigBWe;                  //
wire          DnSigWe;                 //
wire          DsClk19b;                //

//////////////////////////////////////////////////////////////////
//// Common stuff
//////////////////////////////////////////////////////////////////
// Clock inversion for down-stream signalling and PCM RAMs
//////////////////////////////////////////////////////////////////
assign DsClk19b = ~Clk19;

//////////////////////////////////////////////////////////////////
// Priority encoder with error signal for more than one CAM location hit
////////////////////////////////////////////////////////////////// always @ ( RxPcmHit )
  begin
    Hit = 1'b0;
    HitAdd = 5'b00000;
    ErrMulHit = 1'b0;
    ErrMulHitFlg = 1'b0;
```

```verilog
        for (i = 31; i >= 0; i = i -1)
          begin
            if (RxPcmHit[i])
              begin
                Hit = 1'b1;
                if (ErrMulHitFlg) ErrMulHit = 1'b1;
                ErrMulHitFlg = 1'b1;
                HitAdd = i;
              end
          end
        end assign ErrOvrLp = Busy & Hit;

always @ (posedge Clk19 or negedge iRESET_)
  begin
    if (!iRESET_)
      begin
        CAMErr <= 1'b0;
      end
    else
      begin
        CAMErr <= ErrMulHit | ErrOvrLp;
      end
  end ///////////////////////////////////////////////////////////////
// Hit address latch          Latches address on CAM hit
///////////////////////////////////////////////////////////////
always @ (posedge Clk19 or negedge iRESET_)
  begin
    if (!iRESET_)
      begin
        StHitAdd <= 5'b00000;
      end
    else if (Hit & ~Busy)
      begin
        StHitAdd <= HitAdd;
      end
  end ///////////////////////////////////////////////////////////////
// RAM address latch
///////////////////////////////////////////////////////////////
always @ (posedge Clk19 or negedge iRESET_)
  begin
    if (!iRESET_)
      begin
        DnPWAdd <= 6'b000000;
        StBLkSz <= 2'b00;
      end
    else if (We0DnPDIn)
      begin
        DnPWAdd <= {RxSFCnt[0],StHitAdd};
        StBLkSz <= BLkSz;
      end
  end ///////////////////////////////////////////////////////////////
// Block size multiplexer to retrieve the stored block size of the hit CAM
// location
///////////////////////////////////////////////////////////////
assign BLkSz = {StBLkSz1[StHitAdd],StBLkSz0[StHitAdd]};

///////////////////////////////////////////////////////////////
//// PCM RAM address and data control
///////////////////////////////////////////////////////////////
// Delayed Hit signal used as byte 0 write enable, counter start signal
// and RAM storage enable
always @ (posedge Clk19 or negedge iRESET_)
  begin
    if (!iRESET_)
      begin
        We0DnPDIn <= 1'b0;
        dtRxSOH <= 1'b0;
        dRxD <= 8'h00;
      end
    else
      begin
        We0DnPDIn <= Hit & ~Busy;
        dtRxSOH <= tRxSOH;
        dRxD <= RxD;
      end
  end ///////////////////////////////////////////////////////////////
// Byte counter and control
///////////////////////////////////////////////////////////////
assign BlkCntr0 = (BlkCntr == 2'b00);
assign Blksz0 = (BlkSz == 2'b00);

always @ (posedge Clk19 or negedge iRESET_)
  begin
    if (!iRESET_)
      begin
        BlkCntr <= 2'b00;
      end
    else
      begin
        BlkCntr <= nBlkCntr;
      end
  end always @ (We0DnPDIn or StBlkSz or BlkSz0 or dtRxSOH or BlkCntr0 or BlkCntr)
  begin
    if (We0DnPDIn & ~BlkSz0)
      nBlkCntr = 2'b01;
    else if (!dtRxSOH)
      if ((BlkCntr >= StBlkSz) || BlkCntr0)
        nBlkCntr = 2'b00;
      else
        nBlkCntr = BlkCntr + 1'b1;
    else
      nBlkCntr = BlkCntr;
  end assign Busy = nBlkCntr != 2'b00;

always @ (posedge Clk19 or negedge iRESET_)
  begin
    if (!iRESET_)
      begin
        DnPWe <= 1'b0;
        We1DnPDIn <= 1'b0;
        We2DnPDIn <= 1'b0;
        We3DnPDIn <= 1'b0;
```

Appendix A   page 2

```verilog
        end
    else
        begin
        DnPWe <= ~dtRxSOH & (BlkCntr == StBlkSz) & ~BlkCntr0 |
                 BlkSz0 & WeDDnPDIn;
        We1DnPDIn <= ~tRxSOH & (nBlkCntr == 2'b01);
        We2DnPDIn <= ~tRxSOH & (nBlkCntr == 2'b10);
        We3DnPDIn <= ~tRxSOH & (nBlkCntr == 2'b11);
        end
end ///////////////////////////////////////////////////////////////////////////////
// PCM RAM data holding register with individual byte write enables
///////////////////////////////////////////////////////////////////////////////
always @ (posedge Clk19 or negedge iRESET_)
    if (!iRESET_)
        begin
        DnPDIn[31:24] <= 8'h00;
        end
    else if (We0DnPDIn)
        begin
        DnPDIn[31:24] <= dRxD;
        end always @ (posedge Clk19 or negedge iRESET_)
    if (!iRESET_)
        begin
        DnPDIn[23:16] <= 8'h00;
        end
    else if (We0DnPDIn)
        begin
        DnPDIn[23:16] <= 8'h00;
        end
    else if (We1DnPDIn)
        begin
        DnPDIn[23:16] <= dRxD;
        end always @ (posedge Clk19 or negedge iRESET_)
    if (!iRESET_)
        begin
        DnPDIn[15:8] <= 8'h00;
        end
    else if (We0DnPDIn)
        begin
        DnPDIn[15:8] <= 8'h00;
        end
    else if (We2DnPDIn)
        begin
        DnPDIn[15:8] <= dRxD;
        end always @ (posedge Clk19 or negedge iRESET_)
    if (!iRESET_)
        begin
        DnPDIn[7:0] <= 8'h00;
        end
    else if (We0DnPDIn)
        begin
        DnPDIn[7:0] <= 8'h00;
        end
    else if (We3DnPDIn)
        begin
        DnPDIn[7:0] <= dRxD;
        end ///////////////////////////////////////////////////////////////////////////////
// Signalling RAM address and data control
///////////////////////////////////////////////////////////////////////////////
// Common stuff -; various decoded control signals and delayed signals
/////////////////////////////////////////////////////////////////////////////// assign TdmCell = tRxCellType;
assign pValidGrp = TdmCell & (RxGrpCnt != 3'b111);

always @ (posedge Clk19 or negedge iRESET_)
    begin
    if (!iRESET_)
        begin
        dRxDSOCnt <= 4'b0000;
        ValidGrp <= 1'b0;
        end
    else
        begin
        dRxDSOCnt <= RxDSOCnt;
        ValidGrp <= pValidGrp;
        end
    end assign SigBWe = ~dtRxSOH & ValidGrp & (dRxDSOCnt == 4'b1000);
assign SigHit = ~dtRxSOH & ValidGrp & ((1'b0,RxSFCnt) == dRxDSOCnt) &
                (We0DnPDIn | We1DnPDIn | We2DnPDIn | We3DnPDIn);

///////////////////////////////////////////////////////////////////////////////
// Signalling byte and address capture upon detection of PCM hit. Pending
// flag set on hit, held off by write blocking signal, and cleared if no block.
///////////////////////////////////////////////////////////////////////////////
always @ (posedge Clk19 or negedge iRESET_)
    if (!iRESET_)
        SigByte <= 8'h00;
    else if (SigBWe)
        SigByte <= dRxD;

always @ (posedge Clk19 or negedge iRESET_)
    if (!iRESET_)
        begin
        DnSigWAdd <= 7'h00;
        DnSigDIn <= 8'h00;
        end
    else if (SigHit)
        begin
        DnSigWAdd <= (((We0DnPDIn) ? StHitAdd : DnPWAdd[4:0]),
                      (We2DnPDIn | We3DnPDIn),(We1DnPDIn | We3DnPDIn));
        DnSigDIn <= SigByte;
        end always @ (posedge Clk19 or negedge iRESET_)
    if (!iRESET_)
        SigFlg <= 1'b0;
    else if (SigFlg & DnSigWe)
        SigFlg <= 1'b0;
    else if (~SigFlg & SigHit)
        SigFlg <= 1'b1;

assign DnSigWe = SigFlg & ~DnSigWrBlk;
``` endmodule // tdsrmictl

APPENDIX B

```verilog
// tdstint.v :  Down-stream telephony interface
//
// Functional desription:
//
// synthesis constraints
//   sc   ClkList = {Clk4}
//   sc   create_clock Clk4 -period 220 -waveform {0 110}
//   sc   set_clock_skew -uncertainty 3 ClkList
//   sc   set_fix_hold ClkList
//   sc   set_false_path -from {RESET4M_}
//   sc   set_dont_touch_network ClkList
//   sc   set_dont_touch_network RESET4M
//   sc   set_load 32 * Load_of(mSc/CMOF00/D) DsClk4b
//   sc   set_input_delay 1 {DnFrmCnt} module tdstint
  (
   RESET4M_,
   Clk4,
   DsClk4b,
   DnCntrRst,
   DnFrmCnt,
   DnFrmRef,
   RxAISL4M,
   CritPwrAlrmM,
   UsPrtyErr,
   UsOffSetRef,
   DnPDOut,
   DnPRAdd,
   DnPRen,
   DnSigDOut,
   DnSigAdd,
   DnSigRen,
   PtrRAddDS,
   PtrRDOutDUS,
   PtrRRenDS,
   DnMsgFC,
   pTCLK,
   oTFS,
   oTDDA,
   oTDDB,
   oTDDC,
   oTDDD,
   UpReq4M,
   UpRdyOsTInt4M,
   iUPA,
   iUPRNW,
   iUPD,
   UpRDOsTInt,
   BitOffSetChg
   );

input        RESET4M_;           //
input        Clk4;               //
input        DnCntrRst;          //
input        DnFrmCnt;           //
input  [4:0] RxAISL4M;           //
input        CritPwrAlrmM;       // input  [3:0]  UsPrtyErr;         //
input  [31:0] UsOffSetRef;       //
input  [7:0]  DnPDOut;           // //Down-stream PCM RAM Data-Out
input  [8:0]  PtrRDOutDUS;       // //Down-stream Signalling RAM Data-Out
input  [10:1] UpReq4M;           //
input         iUPA;              //
input  [15:0] iUPD;              // output        DsClk4b;           //
output        DnMsgFC;           //
output [1:0]  DnPRAdd;           // //Down-stream PCM RAM Read Address-In
output [5:0]  DnPRen;            // //Down-stream PCM RAM Read Enable
output        DnFrmRef;          // //Down-stream frame reference pulse
output [6:0]  DnSigAdd;          // //Down-stream Signalling RAM Read Address-In
output        DnSigRen;          // //Down-stream Signalling RAM Read Enable
output [6:0]  PtrRAddDS;         //
output        PtrRRenDS;         //
output        oTCLK;             // //Telephony clock
output        oTFS;              // //Telephony frame sync
output        oTDDA;             // //Serial output data for telephony interface A
output        oTDDB;             // //Serial output data for telephony interface B
output        oTDDC;             // //Serial output data for telephony interface C
output        oTDDD;             // //Serial output data for telephony interface D
output        UpRdyOsTInt4M;     //
output [15:0] UpRDOsTInt;        //
output        BitOffSetChg;      //

// local declarations reg [8:0]  BitCnt;               //
reg [8:0]  nBitCnt;              //
reg [4:0]  FrmCnt;               //
reg        oTFS;                 //
reg        DnFrmRef;             //
reg [7:0]  PCMHldRegA;           //
reg [7:0]  PCMHldRegB;           //
reg [7:0]  PCMHldRegC;           //
reg [7:0]  PCMHldRegD;           //
reg [6:0]  DnPRAddLWr;           //
reg        SigEn;                //
reg        PCMEn;                //
reg        PtrRRenDS;            //
reg [7:0]  SigHldRegA;           //
reg [7:0]  SigHldRegB;           //
reg [7:0]  SigHldRegC;           //
reg [7:0]  SigHldRegD;           //
reg [7:0]  TDDAReg;              //
reg [7:0]  TDDBReg;              //
reg [7:0]  TDDCReg;              //
reg [7:0]  TDDDReg;              //
reg [7:0]  PrtyByteA;            //
reg [7:0]  PrtyByteB;            //
reg [7:0]  PrtyByteC;            //
reg [7:0]  PrtyByteD;            //
reg [7:0]  PrtyAccA;             //
reg [7:0]  PrtyAccB;             //
reg [7:0]  PrtyAccC;             //
reg [7:0]  PrtyAccD;             //
reg        pUpRdyOsTInt4M;       //
reg [7:0]  MsgCmd;               //
reg [15:0] MsgAdd;               //
reg [7:0]  MsgWrD;               //
reg [3:0]  MsgXmtEn;             //
reg [7:0]  PCMSigOffB;           //
reg [7:0]  PCMAISByte;           //
```

```
reg      [7:0]  SigAISByte;         //
reg             AutoAIS;            //
reg      [3:0]  UPAIS;              //
reg             MsgPend;            //
reg             MsgEnA;             //
reg             MsgEnB;             //
reg             MsgEnC;             //
reg             MsgEnD;             //
reg      [7:0]  MsgHldCmd;          //
reg      [7:0]  MsgHldHAdd;         //
reg      [7:0]  MsgHldLAdd;         //
reg      [7:0]  MsgHldWrD;          //
reg      [1:0]  DnMsgFC;            //
reg      [8:0]  BitOffset;          //
reg      [8:0]  BitOffsetS;         //
reg      [8:0]  BitOffsetChg;       // wire            dMsgCmd;            //
wire            dMsgAdd;            //
wire            dMsgWrD;            //
wire            dMsgXmtEn;          //
wire            dPCMSigOffB;        //
wire            dPCMAISByte;        //
wire            dSigAISByte;        //
wire            dautoAIS;           //
wire            dUpAIS;             //
wire            dBitOffset;         //
wire            dAny;               //
wire            UpRdyOsTInt4M;      //
wire            UpWr;               //
wire            MsgCmdWr;           //
wire     [7:0]  MsgHAdd;            //
wire     [7:0]  MsgLAdd;            //
wire     [15:0] UpRDDsTInt;         //
wire            MsgHldLd;           //
wire            MsgHldCmdClr;       //
wire            MsgHldHAddClr;      //
wire            MsgHldLAddClr;      //
wire            MsgHldWrDClr;       //
wire            AISA;               //
wire            AISB;               //
wire            AISC;               //
wire            AISD;               //
wire     [7:0]  AlrmByteA;          //
wire     [7:0]  AlrmByteB;          //
wire     [7:0]  AlrmByteC;          //
wire     [7:0]  AlrmByteD;          //
wire            MsgBSel;            //
wire            MsgBCmdSel;         //
wire            MsgBHAddSel;        //
wire            MsgBLAddSel;        //
wire            MsgBWrDSel;         //
wire            MsgBCmdSelA;        //
wire            MsgBHAddSelA;       //
wire            MsgBLAddSelA;       //
wire            MsgBWrDSelA;        //
wire            MsgBCmdSelB;        //
wire            MsgBHAddSelB;       //
wire            MsgBLAddSelB;       //
wire            MsgBWrDSelB;        //
wire            MsgBCmdSelC;        //
wire            MsgBHAddSelC;       //
wire            MsgBLAddSelC;       //
wire            MsgBWrDSelC;        //
wire            MsgBCmdSelD;        //
wire            MsgBHAddSelD;       //
wire            MsgBLAddSelD;       //
wire            MsgBWrDSelD;        //
wire            PCMBSelNrmA;        //
wire            PCMBSelNrmB;        //
wire            PCMBSelNrmC;        //
wire            PCMBSelNrmD;        //
wire            PCMBSelAISA;        //
wire            PCMBSelAISB;        //
wire            PCMBSelAISC;        //
wire            PCMBSelAISD;        //
wire            SigBSelNrmA;        //
wire            SigBSelNrmB;        //
wire            SigBSelNrmC;        //
wire            SigBSelNrmD;        //
wire            SigBSelAISA;        //
wire            SigBSelAISB;        //
wire            SigBSelAISC;        //
wire            SigBSelAISD;        //
wire            DnSigRen;           //
wire            FSSel;              //
wire            RsrvBSel;           //
wire            PrtyBSel;           //
wire            AlrmBSel;           //
wire            PCMSigBSel;         //
wire            PCMBSel;            //
wire            SigBSel;            //
wire            LdShftRegs;         //
wire     [5:0]  DnPRAdd;            //
wire     [6:0]  DnSigRAdd;          //
wire     [7:0]  DnSigOutB;          //
wire     [7:0]  ShftOByteA;         //
wire     [7:0]  ShftOByteB;         //
wire     [7:0]  ShftOByteC;         //
wire     [7:0]  ShftOByteD;         //
wire            RsrvByte;           //
wire            pPtrRAddS;          //
wire     [6:0]  PtrRAddDS;          //
wire            DnCntrRst;          //
wire            DnPRen;             //
wire     [7:0]  DnPDOutB;           //
wire            LdTDDA;             //
wire            LdTDDB;             //
wire            LdTDDC;             //
wire            LdTDDD;             //
wire            oTCLK;              //
wire            oTDDA;              //
wire            oTDDB;              //
wire            oTDDC;              //
wire            oTDDD;              //
wire            LdPrty;             //
wire            DsClk4b;            //

///////////////////////////////////////////////////////
// Constants
///////////////////////////////////////////////////////
parameter  cSFS       = 8'hcc,
           cFS        = 8'hea,
           cUsMsgFCRef = 9'd24;

///////////////////////////////////////////////////////
// Misc assigns
/////////////////////////////////////////////////////// assign oTCLK = Clk4;
```

Appendix B   page 2

```verilog
assign RsrvByte = 8'd0;
///////////////////////////////////////////////////////////////////////////
// Clock inversion for down-stream signalling and PCM RAMs
///////////////////////////////////////////////////////////////////////////
assign DsClk4b = ~Clk4;

///////////////////////////////////////////////////////////////////////////
// Processor address decodes
///////////////////////////////////////////////////////////////////////////
assign dAny         = UpReq4M & (iUPA[10:6] == 5'b000_00);
assign dBitOffset   = dAny & (iUPA[5:1] == 5'b00_000);
assign dPCMSigOffB  = dAny & (iUPA[5:1] == 5'b00_001);
assign dPCMAISByte  = dAny & (iUPA[5:1] == 5'b00_010);
assign dSigAISByte  = dAny & (iUPA[5:1] == 5'b00_011);
assign dAutoAIS     = dAny & (iUPA[5:1] == 5'b00_100);
assign dUpAIS       = dAny & (iUPA[5:1] == 5'b00_101);
assign dMsgXmtEn    = dAny & (iUPA[5:1] == 5'b00_000);
assign dMsgPend     = dAny & (iUPA[5:1] == 5'b00_001);
assign dMsgCmd      = dAny & (iUPA[5:1] == 5'b01_010);
assign dMsgAdd      = dAny & (iUPA[5:1] == 5'b01_011);
assign dMsgWrD      = dAny & (iUPA[5:1] == 5'b01_100);

///////////////////////////////////////////////////////////////////////////
// Offset bit-count capture
///////////////////////////////////////////////////////////////////////////
always @ (posedge Clk4 or negedge RESET4M_)
begin
    if (!RESET4M_)
        begin
            BitOffset <= 9'd0;
        end
    else if (UsOffsetRef)
        begin
            BitOffset <= BitCnt;
        end
end always @ (posedge Clk4 or negedge RESET4M_)
begin
    if (!RESET4M_)
        begin
            BitOffsetS <= 9'd0;
            BitOffsetChg <= 1'b0;
        end
    else
        begin
            BitOffsetS <= BitOffset;
            BitOffsetChg <= BitOffsetS != BitOffset;
        end
end ///////////////////////////////////////////////////////////////////////////
// Processor interface control logic, storage regs, and read mux
///////////////////////////////////////////////////////////////////////////
always @ (posedge Clk4 or negedge RESET4M_)
begin
    if (!RESET4M_)
        begin
            pUpRdyOsTInt4M <= 1'b0;
        end
    else
        begin
            pUpRdyOsTInt4M <= UpReq4M;
        end
end assign UpRdyOsTInt4M = dAny & UpReq4M & ~pUpRdyOsTInt4M;
assign UpWr = ~pUpRdyOsTInt4M & UpReq4M & ~iUPRNW;

assign MsgCmdWr = UpWr & dMsgCmd;

always @ (posedge Clk4 or negedge RESET4M_)
begin
    if (!RESET4M_)
        begin
            MsgCmd <= 8'h00;
        end
    else if (MsgCmdWr)
        begin
            MsgCmd <= iUPD[7:0];
        end
end always @ (posedge Clk4 or negedge RESET4M_)
begin
    if (!RESET4M_)
        begin
            MsgAdd <= 16'h0000;
        end
    else if (UpWr & dMsgAdd)
        begin
            MsgAdd <= iUPD;
        end
end assign MsgHAdd = MsgAdd[15:8];
assign MsgLAdd = MsgAdd[7:0];

always @ (posedge Clk4 or negedge RESET4M_)
begin
    if (!RESET4M_)
        begin
            MsgWrD <= 8'h00;
        end
    else if (UpWr & dMsgWrD)
        begin
            MsgWrD <= iUPD[7:0];
        end
end always @ (posedge Clk4 or negedge RESET4M_)
begin
    if (!RESET4M_)
        begin
            MsgXmtEn <= 4'h0;
        end
    else if (UpWr & dMsgXmtEn)
        begin
            MsgXmtEn <= iUPD[3:0];
        end
end always @ (posedge Clk4 or negedge RESET4M_)
begin
    if (!RESET4M_)
        begin
```

```verilog
          PCMSigOffB <= 8'h02;
        end
      else if (UpWr & dPCMSigOffB)
        begin
          PCMSigOffB <= iUPD[7:0];
        end
    end always @ (posedge Clk4 or negedge RESET4M_)
  begin
    if (!RESET4M_)
      begin
        PCMAISByte <= 8'h7f;
      end
    else if (UpWr & dPCMAISByte)
      begin
        PCMAISByte <= iUPD[7:0];
      end
  end always @ (posedge Clk4 or negedge RESET4M_)
  begin
    if (!RESET4M_)
      begin
        SigAISByte <= 8'h02;
      end
    else if (UpWr & dSigAISByte)
      begin
        SigAISByte <= iUPD[7:0];
      end
  end always @ (posedge Clk4 or negedge RESET4M_)
  begin
    if (!RESET4M_)
      begin
        AutoAIS <= 1'b0;
      end
    else if (UpWr & dAutoAIS)
      begin
        AutoAIS <= iUPD[0];
      end
  end always @ (posedge Clk4 or negedge RESET4M_)
  begin
    if (!RESET4M_)
      begin
        UpAIS <= 4'd0;
      end
    else if (UpWr & dUpAIS)
      begin
        UpAIS <= iUPD[3:0];
      end
  end assign UpRDDstInt = (({8'h00,MsgCmd}      & {16{dMsgCmd}})
                   | ({8'h00,MsgAdd}      & {16{dMsgAdd}})
                   | ({8'h00,MsgWrD}      & {16{dMsgWrD}})
                   | ({12'd0,MsgXmtEn}    & {16{dMsgXmtEn}})
                   | ({15'd0,MsgPend}     & {16{dMsgPend}})
                   | ({8'h00,PCMSigOffB}  & {16{dPCMSigOffB}})
                   | ({8'h00,PCMAISByte}  & {16{dPCMAISByte}})
                   | ({8'h00,SigAISByte}  & {16{dSigAISByte}})
                   | ({15'd0,AutoAIS}     & {16{dAutoAIS}})
                   | ({12'd0,UpAIS}       & {16{dUpAIS}})
                   | ({7'd0,BitOffset}    & {16{dBitOffset}}));

//////////////////////////////////////////////////////////////////////////////
// Master bit counter, reference frame pulse and frame count register
//////////////////////////////////////////////////////////////////////////////
always @ (posedge Clk4 or negedge RESET4M_)
  begin
    if (!RESET4M_)
      begin
        BitCnt <= 9'h00;
        DnFrmRef <= 1'b0;
      end
    else
      begin
        BitCnt <= nBitCnt;
        DnFrmRef <= (BitCnt == 9'b11101_0000);
      end
  end always @ (BitCnt or DnCntrRst)
  begin
    if (DnCntrRst)
      nBitCnt = 9'h00;
    else
      nBitCnt = BitCnt + 1'b1;
  end always @ (posedge Clk4 or negedge RESET4M_)
  begin
    if (!RESET4M_)
      begin
        FrmCnt <= 5'b00000;
      end
    else if (DnCntrRst | (BitCnt == 9'd511))
      FrmCnt <= DnFrmCnt;
  end always @ (posedge Clk4 or negedge RESET4M_)
  begin
    if (!RESET4M_)
      begin
        DnMsgFC <= 2'b00;
      end
    else if (BitCnt == cUsMsgFCRef)
      DnMsgFC <= FrmCnt[1:0];
  end //////////////////////////////////////////////////////////////////////////////
// Address and read enable for pointer and PCM RAMs
//////////////////////////////////////////////////////////////////////////////
assign FSSel = nBitCnt[8:3] == 6'd1;

always @ (posedge Clk4 or negedge RESET4M_)
  begin
    if (!RESET4M_)
      oTFS <= 1'b1;
    else
      oTFS <= (FSSel) ?
                ((FrmCnt ==5'b00000) ?
                  cFS[7-nBitCnt[2:0]] : cFS[7-nBitCnt[2:0]]) :
                1'b1;
  end //////////////////////////////////////////////////////////////////////////////
// Address and read enable for pointer and PCM RAMs
//////////////////////////////////////////////////////////////////////////////
assign PtrRAddDS = {BitCnt[1:0],BitCnt[8:4]};
```

```
assign pPtrRrenDS = BitCnt[3:0] == 4'b0110 |
                    BitCnt[3:0] == 4'b1000 |
                    BitCnt[3:0] == 4'b1011 |
                    BitCnt[3:0] == 4'b1101;

always @ (posedge Clk4 or negedge RESET4M_)
  if (!RESET4M_)
    PtrRRenDS <= 1'b0;
  else
    PtrRRenDS <= pPtrRrenDS;

assign DnPRAdd = {FrmCnt[0],DnPRAddLwr[6:2]};

assign DnPRen =   BitCnt[3:0] == 4'b1000 |
                  BitCnt[3:0] == 4'b1010 |
                  BitCnt[3:0] == 4'b1101 |
                  BitCnt[3:0] == 4'b1111;

assign DnSigRAdd = DnPRAddLwr;

assign DnSigRen  = DnPRen;

//////////////////////////////////////////////////////
// Stored info from pointer RAM
//////////////////////////////////////////////////////
always @ (posedge Clk4 or negedge RESET4M_)
begin
  if (!RESET4M_)
    begin
      DnPRAddLwr <= 7'h00;
      SigEn <= 1'b0;
      PCMEn <= 1'b0;
    end
  else if (PtrRRenDS)
    begin
      DnPRAddLwr <= PtrRDoutDUS[8:2];
      SigEn <= PtrRDoutDUS[1];
      PCMEn <= PtrRDoutDUS[0];
    end
end //////////////////////////////////////////////////////
// Data read muxes for PCM and signalling RAMs
//////////////////////////////////////////////////////
assign DnPDOutB = (~PCMEn) ? PCMSigOffB : (
                  {DnPDOut[31:24] & {8{DnPRAddLwr[1:0] == 2'b00}}} |
                  {DnPDOut[23:16] & {8{DnPRAddLwr[1:0] == 2'b01}}} |
                  {DnPDOut[15:8]  & {8{DnPRAddLwr[1:0] == 2'b10}}} |
                  {DnPDOut[7:0]   & {8{DnPRAddLwr[1:0] == 2'b11}}}
                  );

assign DnSigOutB = (~SigEn) ? PCMSigOffB : DnSigOut;

//////////////////////////////////////////////////////
// Load enables for holding registers
//////////////////////////////////////////////////////
assign LdTDDA = BitCnt[3:0] == 4'b1101;
assign LdTDDB = BitCnt[3:0] == 4'b1010;
assign LdTDDC = BitCnt[3:0] == 4'b1111;
assign LdTDDD = BitCnt[3:0] == 4'b1000;

// Holding registers for PCM and signalling
//
// PCM holding reg for interface C is not needed because the PCM buffer
// read occurs just as the shift byte is needed thus no holding reg is
// required.
//////////////////////////////////////////////////////
always @ (posedge Clk4 or negedge RESET4M_)
begin
  if (!RESET4M_)
    begin
      PCMHldRegA <= 8'h00;
      SigHldRegA <= 8'h00;
    end
  else if (LdTDDA)
    begin
      PCMHldRegA <= DnPDOutB;
      SigHldRegA <= DnSigOutB;
    end
end always @ (posedge Clk4 or negedge RESET4M_)
begin
  if (!RESET4M_)
    begin
      PCMHldRegB <= 8'h00;
      SigHldRegB <= 8'h00;
    end
  else if (LdTDDB)
    begin
      PCMHldRegB <= DnPDOutB;
      SigHldRegB <= DnSigOutB;
    end
end always @ (posedge Clk4 or negedge RESET4M_)
begin
  if (!RESET4M_)
    begin
      SigHldRegC <= 8'h00;
    end
  else if (LdTDDC)
    begin
      SigHldRegC <= DnSigOutB;
    end
end always @ (posedge Clk4 or negedge RESET4M_)
begin
  if (!RESET4M_)
    begin
      PCMHldRegD <= 8'h00;
      SigHldRegD <= 8'h00;
    end
  else if (LdTDDD)
    begin
      PCMHldRegD <= DnPDOutB;
      SigHldRegD <= DnSigOutB;
    end
end //////////////////////////////////////////////////////
// Parity generation and storage
//////////////////////////////////////////////////////
assign LdPrty = RsrvBSel & LdShftRegs;
```

```verilog
always @ (posedge Clk4 or negedge RESET4M_)
  begin
    if (!RESET4M_)
      begin
        PrtyByteA <= 8'h00;
        PrtyByteB <= 8'h00;
        PrtyByteC <= 8'h00;
        PrtyByteD <= 8'h00;
        PrtyAccA <= 8'h00;
        PrtyAccB <= 8'h00;
        PrtyAccC <= 8'h00;
        PrtyAccD <= 8'h00;
      end
    else if (LdPrty)
      begin
        PrtyByteA <= PrtyAccA;
        PrtyByteB <= PrtyAccB;
        PrtyByteC <= PrtyAccC;
        PrtyByteD <= PrtyAccD;
        PrtyAccA <= ~ShftOByteA;
        PrtyAccB <= ~ShftOByteB;
        PrtyAccC <= ~ShftOByteC;
        PrtyAccD <= ~ShftOByteD;
      end
    else if (LdShftRegs)
      begin
        PrtyAccA <= PrtyAccA ^ ShftOByteA;
        PrtyAccB <= PrtyAccB ^ ShftOByteB;
        PrtyAccC <= PrtyAccC ^ ShftOByteC;
        PrtyAccD <= PrtyAccD ^ ShftOByteD;
      end
  end ////////////////////////////////////////////////////////////////////
// Message cpu holding reg, output holding reg, and control logic
//////////////////////////////////////////////////////////////////// always @ (posedge Clk4 or negedge RESET4M_)
  begin
    if (!RESET4M_)
      begin
        MsgPend <= 1'b0;
      end
    else if (MsgCmdWr)
      begin
        MsgPend <= 1'b1;
      end
    else if (MsgHldLd)
      begin
        MsgPend <= 1'b0;
      end
  end always @ (posedge Clk4 or negedge RESET4M_)
  begin
    if (!RESET4M_)
      begin
        MsgEnA <= 1'b0;
        MsgEnB <= 1'b0;
        MsgEnC <= 1'b0;
        MsgEnD <= 1'b0;
      end
    else if (MsgHldWrDClr)
      begin
        MsgEnA <= MsgXmtEn[0];
        MsgEnB <= MsgXmtEn[1];
        MsgEnC <= MsgXmtEn[2];
        MsgEnD <= MsgXmtEn[3];
      end
  end assign MsgHldLd = MsgPend & MsgHldWrDClr;

assign MsgHldCmdClr  = LdShftRegs & MsgBCmdSel;
assign MsgHldAddClr  = LdShftRegs & MsgBHAddSel;
assign MsgHldLAddClr = LdShftRegs & MsgBLAddSel;
assign MsgHldWrDClr  = LdShftRegs & MsgBWrDSel;

always @ (posedge Clk4 or negedge RESET4M_)
  if (!RESET4M_)
    begin
      MsgHldCmd <= 8'h00;
    end
  else if (MsgHldLd)
    begin
      MsgHldCmd <= MsgCmd;
    end
  else if (MsgHldCmdClr)
    begin
      MsgHldCmd <= 8'h00;
    end always @ (posedge Clk4 or negedge RESET4M_)
  if (!RESET4M_)
    begin
      MsgHldHAdd <= 8'h00;
    end
  else if (MsgHldLd)
    begin
      MsgHldHAdd <= MsgHAdd;
    end
  else if (MsgHldHAddClr)
    begin
      MsgHldHAdd <= 8'h00;
    end always @ (posedge Clk4 or negedge RESET4M_)
  if (!RESET4M_)
    begin
      MsgHldLAdd <= 8'h00;
    end
  else if (MsgHldLd)
    begin
      MsgHldLAdd <= MsgLAdd;
    end
  else if (MsgHldLAddClr)
    begin
      MsgHldLAdd <= 8'h00;
    end always @ (posedge Clk4 or negedge RESET4M_)
  if (!RESET4M_)
    begin
      MsgHldWrD <= 8'h00;
    end
  else if (MsgHldLd)
    begin
      MsgHldWrD <= MsgWrD;
    end
  else if (MsgHldWrDClr)
    begin
      MsgHldWrD <= 8'h00;
    end
```

```
////////////////////////////////////////////////////////////////////////////
// Alarms
////////////////////////////////////////////////////////////////////////////
assign AISA = AutoAIS & RxAISL4M | UpAIS[0];
assign AISB = AutoAIS & RxAISL4M | UpAIS[1];
assign AISC = AutoAIS & RxAISL4M | UpAIS[2];
assign AISD = AutoAIS & RxAISL4M | UpAIS[3];

assign AlmByteA = {UsPrtyErr[0],AISA,CritPwrAlm4M,5'b00000};
assign AlmByteB = {UsPrtyErr[1],AISB,CritPwrAlm4M,5'b00000};
assign AlmByteC = {UsPrtyErr[2],AISC,CritPwrAlm4M,5'b00000};
assign AlmByteD = {UsPrtyErr[3],AISD,CritPwrAlm4M,5'b00000};

////////////////////////////////////////////////////////////////////////////
// Output byte select signals and byte muxes
//
// Interface C is different than the others -- see holding reg comment above
//////////////////////////////////////////////////////////////////////////// assign RsrvBSel    = BitCnt[8:3] == 6'd1;
assign PrtyBSel    = BitCnt[8:3] == 6'd2;
assign MsgBSel     = BitCnt[8:3] == 6'd63;
assign AlmBSel     = BitCnt[8:3] == 6'd0;

assign PCMSigBSel  = -RsrvBSel & -PrtyBSel & -MsgBSel & -AlmBSel;
assign PCMBSel     = PCMSigBSel & BitCnt[3];
assign SigBSel     = PCMSigBSel & -BitCnt[3];

assign MsgBCmdSel     = MsgBSel & FrmCnt[1:0] == 2'b00;
assign MsgBHAddSel    = MsgBSel & FrmCnt[1:0] == 2'b01;
assign MsgBLAddSel    = MsgBSel & FrmCnt[1:0] == 2'b10;
assign MsgBWrDSel     = MsgBSel & FrmCnt[1:0] == 2'b11;

assign PCMBSelNrmA    = PCMBSel & -AISA;
assign PCMBSelAISA    = PCMBSel & AISA;
assign SigBSelNrmA    = SigBSel & -AISA;
assign SigBSelAISA    = SigBSel & AISA;
assign MsgBCmdSelA    = MsgEnA & MsgBCmdSel;
assign MsgBHAddSelA   = MsgEnA & MsgBHAddSel;
assign MsgBLAddSelA   = MsgEnA & MsgBLAddSel;
assign MsgBWrDSelA    = MsgEnA & MsgBWrDSel;

assign PCMBSelNrmB    = PCMBSel & -AISB;
assign PCMBSelAISB    = PCMBSel & AISB;
assign SigBSelNrmB    = SigBSel & -AISB;
assign SigBSelAISB    = SigBSel & AISB;
assign MsgBCmdSelB    = MsgEnB & MsgBCmdSel;
assign MsgBHAddSelB   = MsgEnB & MsgBHAddSel;
assign MsgBLAddSelB   = MsgEnB & MsgBLAddSel;
assign MsgBWrDSelB    = MsgEnB & MsgBWrDSel;

assign PCMBSelNrmC    = PCMBSel & -AISC;
assign PCMBSelAISC    = PCMBSel & AISC;
assign SigBSelNrmC    = SigBSel & -AISC;
assign SigBSelAISC    = SigBSel & AISC;
assign MsgBCmdSelC    = MsgEnC & MsgBCmdSel;
assign MsgBHAddSelC   = MsgEnC & MsgBHAddSel;
assign MsgBLAddSelC   = MsgEnC & MsgBLAddSel;
assign MsgBWrDSelC    = MsgEnC & MsgBWrDSel;

assign PCMBSelNrmD    = PCMBSel & -AISD;
assign PCMBSelAISD    = PCMBSel & AISD;
assign SigBSelNrmD    = SigBSel & -AISD;
assign SigBSelAISD    = SigBSel & AISD;
assign MsgBCmdSelD    = MsgEnD & MsgBCmdSel;
assign MsgBHAddSelD   = MsgEnD & MsgBHAddSel;
assign MsgBLAddSelD   = MsgEnD & MsgBLAddSel;
assign MsgBWrDSelD    = MsgEnD & MsgBWrDSel;

assign ShftOByteA = ({8{RsrvBSel}}      & {8{PrtyBSel}}
                   | {8{PCMHldRegA}}    & {8{PCMBSelAISA}}
                   | {8{PCMAISByte}}    & {8{PCMBSelNrmA}}
                   | {8{SigHldRegA}}    & {8{SigBSelAISA}}
                   | {8{SigAISByte}}    & {8{SigBSelNrmA}}
                   | {8{MsgHldCmd}}     & {8{MsgBCmdSelA}}
                   | {8{MsgHldHAdd}}    & {8{MsgBHAddSelA}}
                   | {8{MsgHldLAdd}}    & {8{MsgBLAddSelA}}
                   | {8{MsgHldWrD}}     & {8{MsgBWrDSelA}}
                   | {8{AlmByteA}}      & {8{AlmBSel}});

assign ShftOByteB = ({8{RsrvBSel}}      & {8{PrtyBSel}}
                   | {8{PCMHldRegB}}    & {8{PCMBSelAISB}}
                   | {8{PCMAISByte}}    & {8{PCMBSelNrmB}}
                   | {8{SigHldRegB}}    & {8{SigBSelAISB}}
                   | {8{SigAISByte}}    & {8{SigBSelNrmB}}
                   | {8{MsgHldCmd}}     & {8{MsgBCmdSelB}}
                   | {8{MsgHldHAdd}}    & {8{MsgBHAddSelB}}
                   | {8{MsgHldLAdd}}    & {8{MsgBLAddSelB}}
                   | {8{MsgHldWrD}}     & {8{MsgBWrDSelB}}
                   | {8{AlmByteB}}      & {8{AlmBSel}});

assign ShftOByteC = ({8{RsrvBSel}}      & {8{PrtyBSel}}
                   | {8{DnPDOutB}}      & {8{PCMBSelAISC}}
                   | {8{PCMAISByte}}    & {8{PCMBSelNrmC}}
                   | {8{SigHldRegC}}    & {8{SigBSelAISC}}
                   | {8{SigAISByte}}    & {8{SigBSelNrmC}}
                   | {8{MsgHldCmd}}     & {8{MsgBCmdSelC}}
                   | {8{MsgHldHAdd}}    & {8{MsgBHAddSelC}}
                   | {8{MsgHldLAdd}}    & {8{MsgBLAddSelC}}
                   | {8{MsgHldWrD}}     & {8{MsgBWrDSelC}}
                   | {8{AlmByteC}}      & {8{AlmBSel}});

assign ShftOByteD = ({8{RsrvBSel}}      & {8{PrtyBSel}}
                   | {8{PCMHldRegD}}    & {8{PCMBSelAISD}}
                   | {8{PCMAISByte}}    & {8{PCMBSelNrmD}}
                   | {8{SigHldRegD}}    & {8{SigBSelAISD}}
                   | {8{SigAISByte}}    & {8{SigBSelNrmD}}
                   | {8{MsgHldCmd}}     & {8{MsgBCmdSelD}}
                   | {8{MsgHldHAdd}}    & {8{MsgBHAddSelD}}
                   | {8{MsgHldLAdd}}    & {8{MsgBLAddSelD}}
                   | {8{MsgHldWrD}}     & {8{MsgBWrDSelD}}
                   | {8{AlmByteD}}      & {8{AlmBSel}});

////////////////////////////////////////////////////////////////////////////
// Byte load signal for output shift registers
//////////////////////////////////////////////////////////////////////////// assign LdShftRegs = BitCnt[2:0] == 3'b11;

////////////////////////////////////////////////////////////////////////////
// Output shift registers
//////////////////////////////////////////////////////////////////////////// always @ (posedge Clk4 or negedge RESET4M_)
begin
  if (!RESET4M_)
```

Appendix B page 7

```verilog
         begin
            TDDAReg <= 8'h00;
         end
         else if (LdShftRegs)
            begin
               TDDAReg <= ShftOByteA;
            end
         else
            begin
               TDDAReg <= {TDDAReg[6:0],1'b0};
            end
      end assign oTDDA = TDDAReg[7];

always @ (posedge Clk4 or negedge RESET4M_)
   begin
      if (!RESET4M_)
         begin
            TDDBReg <= 8'h00;
         end
      else if (LdShftRegs)
         begin
            TDDBReg <= ShftOByteB;
         end
      else
         begin
            TDDBReg <= {TDDBReg[6:0],1'b0};
         end
   end assign oTDDB = TDDBReg[7];

always @ (posedge Clk4 or negedge RESET4M_)
   begin
      if (!RESET4M_)
         begin
            TDDCReg <= 8'h00;
         end
      else if (LdShftRegs)
         begin
            TDDCReg <= ShftOByteC;
         end
      else
         begin
            TDDCReg <= {TDDCReg[6:0],1'b0};
         end
   end assign oTDDC = TDDCReg[7];

always @ (posedge Clk4 or negedge RESET4M_)
   begin
      if (!RESET4M_)
         begin
            TDDDReg <= 8'h00;
         end
      else if (LdShftRegs)
         begin
            TDDDReg <= ShftOByteD;
         end
      else
         begin
            TDDDReg <= {TDDDReg[6:0],1'b0};
         end
   end assign oTDDD = TDDDReg[7];

endmodule  // tdstint
```

APPENDIX C

```verilog
// tptrrmctl.v :   Pointer RAM control
//
// Functional description:
//
//
// synthesis constraints
//
// sc   ClkList = {Clk4}
// sc   create_clock Clk4 -period 220 -waveform {0 110}
// sc   set_clock_skew -uncertainty 3 ClkList
// sc   set_fix_hold ClkList
// sc   set_false_path -from {RESET4M_}
// sc   set_dont_touch_network ClkList
// sc   set_dont_touch_network RESET4M
// sc   set_load 32 * load_of(mSc/CMDF00/D) PtrClk4b module tptrrmctl
(
    RESET4M_,
    Clk4,
    PtrClk4b,
    PtrRAddDS,
    PtrRRenDS,
    PtrRAddUS,
    PtrRReqUS,
    PtrRAckUS,
    PtrRAdd,
    PtrRDOut,
    PtrRDOutDUS,
    PtrRCeb,
    PtrRWrb,
    UpReq4M,
    UpRdyPtrRmCtl4M,
    iUPA,
    iUPRNW,
    iUPD,
    UpRDPtrRmCtl
);

input           RESET4M_;
input           Clk4;
output          PtrClk4b;
input   [6:0]   PtrRAddDS;
input           PtrRRenDS;
output  [6:0]   PtrRAddUS;
output          PtrRReqUS;
input           PtrRAckUS;
output  [6:0]   PtrRAdd;
input   [8:0]   PtrRDOut;
output  [8:0]   PtrRDOutDUS;
output          PtrRCeb;
output          PtrRWrb;
input           UpReq4M;
output          UpRdyPtrRmCtl4M;
input   [10:1]  iUPA;
input           iUPRNW;
input   [15:0]  iUPD;
output  [15:0]  UpRDPtrRmCtl;

// local declarations
reg             dUpReq4M;               //
reg             UpPtrRmReqLt;           //
reg             DataEn;                 // wire            PtrRmHit;               //
wire            UpPtrRmReqSt;           //
wire            /UpPtrRmReq;            //
wire            UpRdyPtrRmCtl4M;        //
wire            PtrRAckUS;              //
wire            PtrRCeb;                //
wire    [6:0]   PtrRAdd;                //
wire    [8:0]   PtrRDOutDUS;            //
wire    [8:0]   UpRDPtrRmCtl;           //
wire            CtrlHit;                //
wire            CtrlRdy;                //
wire            UpPtrRmRdy;             //
wire            PtrRWr;                 //
wire            PtrClk4b;               //

/////////////////////////////////////////////////
// Clock inversion for pointer RAM
/////////////////////////////////////////////////
assign PtrClk4b = ~Clk4;

// Address decode
/////////////////////////////////////////////////
assign PtrRmHit = UpReq4M & iUPA[10:8] == 3'b001;
assign CtrlHit  = UpReq4M & iUPA[10:1] == 10'b000_1000_000;

/////////////////////////////////////////////////
// Cpu request for pointer RAM signal
/////////////////////////////////////////////////
always @ (posedge Clk4 or negedge RESET4M_)
    if (!RESET4M_)
        dUpReq4M <= 1'b0;
    else
        dUpReq4M <= UpReq4M;

assign UpPtrRmReqSt = ~dUpReq4M & PtrRmHit;
assign CtrlRdy      = ~dUpReq4M & CtrlHit;

always @ (posedge Clk4 or negedge RESET4M_)
    if (!RESET4M_)
        UpPtrRmReqLt <= 1'b0;
    else if (UpPtrRmRdy)
        UpPtrRmReqLt <= 1'b0;
    else if (UpPtrRmReqSt)
        UpPtrRmReqLt <= 1'b1;

assign UpPtrRmReq = UpPtrRmReqSt | UpPtrRmReqLt;

/////////////////////////////////////////////////
// Arbitration between Cpu and up-stream
// Up-stream has priority over the Cpu
/////////////////////////////////////////////////
assign UpPtrRmRdy = ~PtrRRenDS & ~PtrRReqUS & UpPtrRmReq;
assign UpRdyPtrRmCtl4M = UpPtrRmReqLt | CtrlRdy;
```

Appendix C    page 1

```
assign PtrRAckUS = ~PtrRRenDS & PtrRReqUS;

//////////////////////////////////////////////////////////////////////
// Pointer RAM Add mux and control signals
//////////////////////////////////////////////////////////////////////
assign PtrRAdd =    (PtrRAdd0S & {7{PtrRRenDS}}) |
                    (PtrRAddUS & {7{PtrRAckUS}}) |
                    (iUPA[7:1] & {7{UpPtrRmRdy}});

assign PtrRCeb = ~(PtrRRenDS | PtrRAckUS | UpPtrRmRdy);

assign PtrRWrb = ~iUPRNW & UpPtrRmRdy;

//////////////////////////////////////////////////////////////////////
// Pointer RAM data disable function
//////////////////////////////////////////////////////////////////////
assign PtrRDOutDUS =    (PtrRDOut & {9{DataEn}});

//////////////////////////////////////////////////////////////////////
// control register
//////////////////////////////////////////////////////////////////////
assign CtrlWr = ~iUPRNW & CtrlRdy;

always @ (posedge CLK4 or negedge RESET4M_)
    if (!RESET4M_)
        DataEn <= 1'b0;
    else if (CtrlWr)
        DataEn <= iUPD[0];

//////////////////////////////////////////////////////////////////////
// Cpu read data mux
//////////////////////////////////////////////////////////////////////
assign UpRDPtrRmctl =   ({7'd0,PtrRDOut} & {16{PtrRmHit}}) |
                        ({15'd0,DataEn} & {16{CtrlHit}});

endmodule // tptrrmctl
```

APPENDIX D

```
// tustint.v :   Up-stream telephony interface
//
//
// Functional desription:
//
//
// synthesis constraints
//
// sc   ClkList = {Clk4 UsClk4b}
// sc   create_clock Clk4 -period 220 -waveform {0 110}
// sc   set_clock_skew -uncertainty 3 ClkList
// sc   set_fix_hold ClkList
// sc   set_false_path -from {RESET4M_}
// sc   set_dont_touch_network ClkList
// sc   set_dont_touch_network RESET4M_
// sc   set_load 32 * load_of(mSc/CMDF00/D) UsClk4b
// sc   set_input_delay 1 {UsFrmCnt} module tustint
(
RESET4M_,
Clk4,
UsClk4b,
UsCntrRst,
UsFrmRef,
UsFrmCnt,
DnMsgFC,
BitOffsetChg,
UsOffsetRef,
UsPDIn,
UsPWAdd,
UsPWen,
UsSigIn,
UsSigWAdd,
UsSigWen,
PtrRAddUS,
PtrRDOutDUS,
PtrRReqUS,
PtrRACkUS,
UsSigRdBlk4M,
iTUDA,
iTUDB,
iTUDC,
iTUDD,
UsPrtyErr,
UpReq4M,
UpRdyUsTInt4M,
iUPA,
iUPRNW,
iUPD,
UpRDUsTInt,
UpIntUsTInt
);

input           RESET4M_;
input           Clk4;
input           UsCntrRst;
input   [2:0]   UsFrmCnt;                   //
```

Appendix D  page 1

```
reg  [7:0]   PrtyByteC;           //
reg  [7:0]   PrtyByteD;           //
reg  [7:0]   PrtyAccA;            //
reg  [7:0]   PrtyAccB;            //
reg  [7:0]   PrtyAccC;            //
reg  [7:0]   PrtyAccD;            //
reg          pUpRdyUsTint4M;      //
reg          MsgIntNum;           //
reg  [3:0]   ActivityS;           //
reg  [9:0]   LatAlm0;             //
reg  [9:0]   LatAlm1;             //
reg  [15:0]  IntAlm0;             //
reg  [9:0]   IntAlm1;             //
reg  [15:0]  IntMsk0;             //
reg  [15:0]  IntMsk1;             //
reg  [1:0]   MsgFrmCnt;           //
reg          usOffsetRef;         //
reg  [10:0]  ActTmr;              //
reg  [10:0]  nActTmr;             //
reg          GotEdgeA;            //
reg          GotEdgeB;            //
reg          GotEdgeC;            //
reg          GotEdgeD;            //
reg          ActivityA;           //
reg          ActivityB;           //
reg          ActivityC;           //
reg          ActivityD;           //
reg          LdPrtyErr;           //
reg  [7:0]   PCMAISByte;          //
reg  [7:0]   SigAISByte;          //
reg          UpAIS;               //
reg  [3:0]   UsPrtyErr;           //
reg  [1:0]   MsgIntNums;          //
reg  [7:0]   MsgHldCmd;           //
reg  [7:0]   MsgHldAdd;           //
reg  [7:0]   MsgHldLAdd;          //
reg  [7:0]   MsgCmd;              //
reg  [7:0]   MsgLAdd;             //
reg  [7:0]   MsgRdD;              //
reg          dMsgCmd;             //
reg          dMsgAdd;             //
reg          dMsgRdD;             //
reg          dMsgIntNum;          //
reg          dactivity;           //
reg          dLatAlm0;            //
reg          dLatAlm1;            //
reg          dIntAlm0;            //
reg          dIntAlm1;            //
reg          dIntMsk0;            //
reg          dIntMsk1;            //
reg          dany;                //
reg          UpRdyUsTint4M;       //
wire         UpWr;                //
wire [3:0]   Activity;            //
wire [3:0]   RiseAct;             //
wire [3:0]   FallAct;             //
wire         LatAlmOWr;           //
wire         LatAlm1Wr;           //
wire         IntAlmOWr;           //
wire         IntAlm1Wr;           //
wire         UpIntUsTint;         //
wire         LastBit;             //
wire         ActTick;             //
wire         EdgeA;               //
wire         EdgeB;               //
wire         EdgeC;               //
wire         EdgeD;               //
wire         MsgSlot;             //
wire         PrtyErrA;            //
wire         PrtyErrB;            //
wire         PrtyErrC;            //
wire         PrtyErrD;            //
wire         DsPrtyAlmA;          //
wire         DsPrtyAlmB;          //
wire         DsPrtyAlmC;          //
wire         DsPrtyAlmD;          //
wire         UsMiscAlm1A;         //
wire         UsMiscAlm1B;         //
wire         UsMiscAlm1C;         //
wire         UsMiscAlm1D;         //
wire         UsMiscAlm2A;         //
wire         UsMiscAlm2B;         //
wire         UsMiscAlm2C;         //
wire         UsMiscAlm2D;         //
wire         PrtyErr;             //
wire [3:0]   RcvMsgTick;          //
wire         ErlyLdMsg;           //
wire         LdMsgIntNum;         //
wire [7:0]   MsgByte;             //
wire         LdMsgCmd;            //
wire         LdMsgAdd;            //
wire         LdMsgLAdd;           //
wire         LdMsgRdD;            //
wire         LdHld;               //
wire         LdRsrv;              //
wire         LdPrty;              //
wire         LdMsg;               //
wire         LdAlrm;              //
wire         LdPCMSig;            //
wire         LdPCM;               //
wire         LdSig;               //
wire         PtrReqUS;            //
wire [6:0]   UsSigWen;            //
wire         UsPWen;              //
wire [7:0]   PtrAddUS;            //
wire [6:0]   UsPWAdd;             //
wire [6:0]   UsSigAdd;            //
wire [7:0]   UsSigDIn;            //
wire         UsPDIn;              //
wire         LdPrtyAcc;           //
wire         usClk4b;              //
wire         SelIntA;             //
wire         SelIntB;             //
wire         SelIntC;             //
wire         SelIntD;             //
wire         SelSigA;             //
wire         SelSigB;             //
wire         SelSigC;             //
wire         SelSigD;             //
wire         SelPCMA;             //
wire         SelPCMB;             //
wire         SelPCMC;             //
wire         SelPCMD;             //
wire         SelAIS;              //
wire         dPCMAISByte;         //
wire         dSigAISByte;         //
wire         duPAIS;              //

///////////////////////////////////////////////
// Constants
///////////////////////////////////////////////
```

```verilog
parameter cOffsetRef = 9'd485;
////////////////////////////////////////////////////////////////////////
// Clock inversion for up-stream signalling and PCM RAMs
////////////////////////////////////////////////////////////////////////
assign UsClk4b = ~Clk4;

////////////////////////////////////////////////////////////////////////
// Processor address decodes
////////////////////////////////////////////////////////////////////////
assign dAny        = UpReq4M & (iUPA[10:6] == 5'b000_01);
assign dActivity   = dAny & (iUPA[5:1] == 5'b00_000);
assign dLatAlm0    = dAny & (iUPA[5:1] == 5'b00_001);
assign dLatAlm1    = dAny & (iUPA[5:1] == 5'b00_010);
assign dIntAlm0    = dAny & (iUPA[5:1] == 5'b00_011);
assign dIntAlm1    = dAny & (iUPA[5:1] == 5'b00_100);
assign dIntMsk0    = dAny & (iUPA[5:1] == 5'b00_101);
assign dIntMsk1    = dAny & (iUPA[5:1] == 5'b00_110);
assign dMsgIntNum  = dAny & (iUPA[5:1] == 5'b00_111);
assign dMsgCmd     = dAny & (iUPA[5:1] == 5'b01_000);
assign dMsgAdd     = dAny & (iUPA[5:1] == 5'b01_001);
assign dMsgRqD     = dAny & (iUPA[5:1] == 5'b01_010);
assign dPCMAISByte = dAny & (iUPA[5:1] == 5'b01_011);
assign dSigAISByte = dAny & (iUPA[5:1] == 5'b01_100);
assign dUpAIS      = dAny & (iUPA[5:1] == 5'b01_101);
assign               dAny & (iUPA[5:1] == 5'b01_110);

////////////////////////////////////////////////////////////////////////
// Porcessor interface control logic, storage regs, and read mux
////////////////////////////////////////////////////////////////////////
always @ (posedge Clk4 or negedge RESET4M_)
  begin
    if (!RESET4M_)
      begin
        pUpRdyUsTInt4M <= 1'b0;
      end
    else
      begin
        pUpRdyUsTInt4M <= UpReq4M;
      end
  end assign UpRdyUsTInt4M = dAny & UpReq4M & ~pUpRdyUsTInt4M;
assign UpWr         = UpRdyUsTInt4M & ~iUPRNW;

always @ (posedge Clk4 or negedge RESET4M_)
  begin
    if (!RESET4M_)
      begin
        PCMAISByte <= 8'h7f;
      end
    else if (UpWr & dPCMAISByte)
      begin
        PCMAISByte <= iUPD[7:0];
      end
  end always @ (posedge Clk4 or negedge RESET4M_)
  begin
    if (!RESET4M_)
      begin
        SigAISByte <= 8'h02;
      end
    else if (UpWr & dSigAISByte)
      begin
        SigAISByte <= iUPD[7:0];
      end
  end always @ (posedge Clk4 or negedge RESET4M_)
  begin
    if (!RESET4M_)
      begin
        UpAIS <= 4'hf;
      end
    else if (UpWr & dUpAIS)
      begin
        UpAIS <= iUPD[3:0];
      end
  end always @ (posedge Clk4 or negedge RESET4M_)
  begin
    if (!RESET4M_)
      begin
        MsgIntNum <= 2'b00;
      end
    else if (UpWr & dMsgIntNum)
      begin
        MsgIntNum <= iUPD[1:0];
      end
  end assign LatAlm0Wr = UpWr & dLatAlm0;

always @ (posedge Clk4 or negedge RESET4M_)
  begin
    if (!RESET4M_)
      begin
        LatAlm0 <= 10'd0;
      end
    else
      begin
        LatAlm0[0] <= LatAlm0[0] ? ~(~BitOffsetChg& LatAlm0Wr & iUPD[0]) : BitOffsetC
        LatAlm0[1] <= LatAlm0[1] ? ~(~RcvMsgTick   & LatAlm0Wr & iUPD[1]) : RcvMsgTi
        LatAlm0[2] <= LatAlm0[2] ? ~(~UsMiscAlm1A  & LatAlm0Wr & iUPD[2]) : UsMiscAl
        LatAlm0[3] <= LatAlm0[3] ? ~(~UsMiscAlm1B  & LatAlm0Wr & iUPD[3]) : UsMiscAl
        LatAlm0[4] <= LatAlm0[4] ? ~(~UsMiscAlm1C  & LatAlm0Wr & iUPD[4]) : UsMiscAl
        LatAlm0[5] <= LatAlm0[5] ? ~(~UsMiscAlm1D  & LatAlm0Wr & iUPD[5]) : UsM
        LatAlm0[6] <= LatAlm0[6] ? ~(~UsMiscAlm2A  & LatAlm0Wr & iUPD[6]) : UsM
        LatAlm0[7] <= LatAlm0[7] ? ~(~UsMiscAlm2B  & LatAlm0Wr & iUPD[7]) : UsMiscAl
        LatAlm0[8] <= LatAlm0[8] ? ~(~UsMiscAlm2C  & LatAlm0Wr & iUPD[8]) : UsMiscAl
        LatAlm0[9] <= LatAlm0[9] ? ~(~UsMiscAlm2D  & LatAlm0Wr & iUPD[9]) : UsMiscAl
      end
  end assign Activity = {ActivityD,ActivityC,ActivityB,ActivityA};

always @ (posedge Clk4 or negedge RESET4M_)
  begin
    if (!RESET4M_)
      begin
        ActivityS <= 4'h0;
      end
    else
      begin
        ActivityS <= Activity;
      end
  end
```

Appendix D page 3

```verilog
assign RiseAct =  Activity & ~Activitys;
assign FallAct = ~Activity &  Activitys;

assign LatAlm1Wr = UpWr & dLatAlm1;

always @ (posedge Clk4 or negedge RESET4M_)
  begin
    if (!RESET4M_)
      begin
        LatAlm1 <= 16'd0;
      end
    else
      begin
        LatAlm1[0]  <= LatAlm1Wr & iUPD[0]  ? ~(~FallAct[0])    : LatAlm1[0];
        LatAlm1[1]  <= LatAlm1Wr & iUPD[1]  ? ~(~RiseAct[0])    : LatAlm1[1];
        LatAlm1[2]  <= LatAlm1Wr & iUPD[2]  ? ~(~DsPrtyAlmA)    : LatAlm1[2];
        LatAlm1[3]  <= LatAlm1Wr & iUPD[3]  ? ~(~PrtyErr[0])    : LatAlm1[3];
        LatAlm1[4]  <= LatAlm1Wr & iUPD[4]  ? ~(~FallAct[1])    : LatAlm1[4];
        LatAlm1[5]  <= LatAlm1Wr & iUPD[5]  ? ~(~RiseAct[1])    : LatAlm1[5];
        LatAlm1[6]  <= LatAlm1Wr & iUPD[6]  ? ~(~DsPrtyAlmB)    : LatAlm1[6];
        LatAlm1[7]  <= LatAlm1Wr & iUPD[7]  ? ~(~PrtyErr[1])    : LatAlm1[7];
        LatAlm1[8]  <= LatAlm1Wr & iUPD[8]  ? ~(~FallAct[2])    : LatAlm1[8];
        LatAlm1[9]  <= LatAlm1Wr & iUPD[9]  ? ~(~RiseAct[2])    : LatAlm1[9];
        LatAlm1[10] <= LatAlm1Wr & iUPD[10] ? ~(~DsPrtyAlmC)    : LatAlm1[10];
        LatAlm1[11] <= LatAlm1Wr & iUPD[11] ? ~(~PrtyErr[2])    : LatAlm1[11];
        LatAlm1[12] <= LatAlm1Wr & iUPD[12] ? ~(~FallAct[3])    : LatAlm1[12];
        LatAlm1[13] <= LatAlm1Wr & iUPD[13] ? ~(~RiseAct[3])    : LatAlm1[13];
        LatAlm1[14] <= LatAlm1Wr & iUPD[14] ? ~(~DsPrtyAlmD)    : LatAlm1[14];
        LatAlm1[15] <= LatAlm1Wr & iUPD[15] ? ~(~PrtyErr[3])    : LatAlm1[15];
      end
  end assign IntAlm0Wr = UpWr & dIntAlm0;

always @ (posedge Clk4 or negedge RESET4M_)
  begin
    if (!RESET4M_)
      begin
        IntAlm0 <= 10'd0;
      end
    else
      begin
        IntAlm0[0] <= IntAlm0Wr & iUPD[0] ? ~(IntAlm1Wr & iUPD[0]) : BitOffsetchg;
        IntAlm0[1] <= IntAlm0Wr & iUPD[1] ? ~(IntAlm1Wr & iUPD[1]) : RcvMsgtick;
        IntAlm0[2] <= IntAlm0Wr & iUPD[2] ? ~(IntAlm1Wr & iUPD[2]) : UsMiscAlm1A;
        IntAlm0[3] <= IntAlm0Wr & iUPD[3] ? ~(IntAlm1Wr & iUPD[3]) : UsMiscAlm1B;
        IntAlm0[4] <= IntAlm0Wr & iUPD[4] ? ~(IntAlm1Wr & iUPD[4]) : UsMiscAlm1C;
        IntAlm0[5] <= IntAlm0Wr & iUPD[5] ? ~(IntAlm1Wr & iUPD[5]) : UsMiscAlm1D;
        IntAlm0[6] <= IntAlm0Wr & iUPD[6] ? ~(IntAlm1Wr & iUPD[6]) : UsMiscAlm2A;
        IntAlm0[7] <= IntAlm0Wr & iUPD[7] ? ~(IntAlm1Wr & iUPD[7]) : UsMiscAlm2B;
        IntAlm0[8] <= IntAlm0Wr & iUPD[8] ? ~(IntAlm1Wr & iUPD[8]) : UsMiscAlm2C;
        IntAlm0[9] <= IntAlm0Wr & iUPD[9] ? ~(IntAlm1Wr & iUPD[9]) : UsMiscAlm2D;
      end
  end assign IntAlm1Wr = UpWr & dIntAlm1;

always @ (posedge Clk4 or negedge RESET4M_)
  begin
    if (!RESET4M_)
      begin
        IntAlm1 <= 16'd0;
      end
    else
      begin
        IntAlm1[0] <= IntAlm1[0] ? ~(IntAlm1Wr & iUPD[0]) : FallAct[0];
        IntAlm1[1] <= IntAlm1Wr & iUPD[1] ? ~(IntAlm1Wr & iUPD[1]) : RiseAct[0];
        IntAlm1[2] <= IntAlm1Wr & iUPD[2] ? ~(IntAlm1Wr & iUPD[2]) : DsPrtyAlmA;
        IntAlm1[3] <= IntAlm1Wr & iUPD[3] ? ~(IntAlm1Wr & iUPD[3]) : PrtyErr[0];
        IntAlm1[4] <= IntAlm1Wr & iUPD[4] ? ~(IntAlm1Wr & iUPD[4]) : FallAct[1];
        IntAlm1[5] <= IntAlm1Wr & iUPD[5] ? ~(IntAlm1Wr & iUPD[5]) : RiseAct[1];
        IntAlm1[6] <= IntAlm1Wr & iUPD[6] ? ~(IntAlm1Wr & iUPD[6]) : DsPrtyAlmB;
        IntAlm1[7] <= IntAlm1Wr & iUPD[7] ? ~(IntAlm1Wr & iUPD[7]) : PrtyErr[1];
        IntAlm1[8] <= IntAlm1Wr & iUPD[8] ? ~(IntAlm1Wr & iUPD[8]) : FallAct[2];
        IntAlm1[9] <= IntAlm1Wr & iUPD[9] ? ~(IntAlm1Wr & iUPD[9]) : RiseAct[2];
        IntAlm1[10] <= IntAlm1Wr & iUPD[10] ? ~(IntAlm1Wr & iUPD[10]) : DsPrtyAlmC;
        IntAlm1[11] <= IntAlm1Wr & iUPD[11] ? ~(IntAlm1Wr & iUPD[11]) : PrtyErr[2];
        IntAlm1[12] <= IntAlm1Wr & iUPD[12] ? ~(IntAlm1Wr & iUPD[12]) : FallAct[3];
        IntAlm1[13] <= IntAlm1Wr & iUPD[13] ? ~(IntAlm1Wr & iUPD[13]) : RiseAct[3];
        IntAlm1[14] <= IntAlm1Wr & iUPD[14] ? ~(IntAlm1Wr & iUPD[14]) : DsPrtyAlmD;
        IntAlm1[15] <= IntAlm1Wr & iUPD[15] ? ~(IntAlm1Wr & iUPD[15]) : PrtyErr[3];
      end
  end always @ (posedge Clk4 or negedge RESET4M_)
  begin
    if (!RESET4M_)
      begin
        IntMsk0 <= 10'd0;
      end
    else if (UpWr & dIntMsk0)
      begin
        IntMsk0 <= iUPD[9:0];
      end
  end always @ (posedge Clk4 or negedge RESET4M_)
  begin
    if (!RESET4M_)
      begin
        IntMsk1 <= 16'd0;
      end
    else if (UpWr & dIntMsk1)
      begin
        IntMsk1 <= iUPD[15:0];
      end
  end assign UpRDUSTInt = ({8'h00,MsgCmd}       & {16{cdMsgCmd}})
                  | ({MsgHAdd,MsgLAdd}    & {16{cdMsgAdd}})
                  | ({8'h00,MsgRD}        & {16{cdMsgRdD}})
                  | ({14'd0,MsgIntNum}    & {16{cdMsgIntNum}})
                  | ({8'h00,PCMAISByte}   & {16{cdPCMAISByte}})
                  | ({8'h00,SigAISByte}   & {16{cdSigAISByte}})
                  | ({12'd0,UpAIS}        & {16{cdUpAIS}})
                  | ({12'd0,Activity}     & {16{cdActivity}})
                  | ({6'd0,LatAlm0}       & {16{cdLatAlm0}})
                  | ({LatAlm1}            & {16{cdLatAlm1}})
                  | ({6'd0,IntAlm0}       & {16{cdIntAlm0}})
                  | ({IntAlm1}            & {16{cdIntAlm1}})
                  | ({IntMsk0}            & {16{cdIntMsk0}})
                  | ({IntMsk1}            & {16{cdIntMsk1}});

////////////////////////////////////////////////////////////////////////////////
// Master bit counter, reference frame pulse and frame count register
//////////////////////////////////////////////////////////////////////////////// always @ (posedge Clk4 or negedge RESET4M_)
  begin
    if (!RESET4M_)
```

Appendix D  page 4

```verilog
        begin
          BitCnt <= 9'h00;
          UsFrmRef <= 1'b0;
        end
      else
        begin
          BitCnt <= nBitCnt;
          UsFrmRef <= (BitCnt == 9'b11101_0000);
        end
    end always @ (BitCnt or UsCntrRst)
  begin
    if (UsCntrRst)
      nBitCnt = 9'h00;
    else
      nBitCnt = BitCnt + 1'b1;
  end assign LastBit = (BitCnt == 9'd511);

always @ (posedge Clk4 or negedge RESET4M_)
  begin
    if (!RESET4M_)
      FrmCnt <= 3'b000;
    else if (UsCntrRst | LastBit)
      FrmCnt <= UsFrmCnt;
  end always @ (posedge Clk4 or negedge RESET4M_)
  begin
    if (!RESET4M_)
      begin
        MsgFrmCnt <= 2'b00;
        MsgFrmCnt <= DnMsgFC;
      end
  end ////////////////////////////////////////////////////////////////////
// Reference pulse used by down-stream module to capture bit offset for TIUA
////////////////////////////////////////////////////////////////////
always @ (posedge Clk4 or negedge RESET4M_)
  begin
    if (!RESET4M_)
      UsOffsetRef <= 1'b0;
    else
      UsOffsetRef <= BitCnt == cOffsetRef;
  end ////////////////////////////////////////////////////////////////////
// Input shift registers with data clocked in on the falling edge of the 4MHz
////////////////////////////////////////////////////////////////////
always @ (posedge Clk4 or negedge RESET4M_)
  begin
    if (!RESET4M_)
      begin
        TUDA <= 1'b0;
        TUDB <= 1'b0;
        TUDC <= 1'b0;
        TUDD <= 1'b0;
      end
    else
      begin
        TUDA <= iTUDA;
        TUDB <= iTUDB;
        TUDC <= iTUDC;
        TUDD <= iTUDD;
      end
  end always @ (posedge Clk4 or negedge RESET4M_)
  begin
    if (!RESET4M_)
      begin
        TUDAReg <= 8'h00;
      end
    else
      begin
        TUDAReg <= {TUDAReg[6:0],TUDA};
      end
  end always @ (posedge Clk4 or negedge RESET4M_)
  begin
    if (!RESET4M_)
      begin
        TUDBReg <= 8'h00;
      end
    else
      begin
        TUDBReg <= {TUDBReg[6:0],TUDB};
      end
  end always @ (posedge Clk4 or negedge RESET4M_)
  begin
    if (!RESET4M_)
      begin
        TUDCReg <= 8'h00;
      end
    else
      begin
        TUDCReg <= {TUDCReg[6:0],TUDC};
      end
  end always @ (posedge Clk4 or negedge RESET4M_)
  begin
    if (!RESET4M_)
      begin
        TUDDReg <= 8'h00;
      end
    else
      begin
        TUDDReg <= {TUDDReg[6:0],TUDD};
      end
  end ////////////////////////////////////////////////////////////////////
// Activity detectors -- at least one edge must occur every four frames
////////////////////////////////////////////////////////////////////
always @ (posedge Clk4 or negedge RESET4M_)
  begin
    if (!RESET4M_)
      begin
        ActTmr <= 11'd0;
      end
    else
      begin
        ActTmr <= nActTmr;
      end
  end
```

Appendix D page 5

```verilog
      end
   end always @ (ActTmr)
   begin
      nActTmr = ActTmr + 1'b1;
   end assign ActTick = ~nActTmr[10] & ActTmr[10];

assign EdgeA = TUDAReg[1] != TUDAReg[0];
assign EdgeB = TUDBReg[1] != TUDBReg[0];
assign EdgeC = TUPCReg[1] != TUPCReg[0];
assign EdgeD = TUDDReg[1] != TUDDReg[0];

always @ (posedge Clk4 or negedge RESET4M_)
   if (!RESET4M_)
      GotEdgeA <= 1'b0;
   else if (EdgeA)
      GotEdgeA <= 1'b1;
   else if (ActTick)
      GotEdgeA <= 1'b0;

always @ (posedge Clk4 or negedge RESET4M_)
   if (!RESET4M_)
      GotEdgeB <= 1'b0;
   else if (EdgeB)
      GotEdgeB <= 1'b1;
   else if (ActTick)
      GotEdgeB <= 1'b0;

always @ (posedge Clk4 or negedge RESET4M_)
   if (!RESET4M_)
      GotEdgeC <= 1'b0;
   else if (EdgeC)
      GotEdgeC <= 1'b1;
   else if (ActTick)
      GotEdgeC <= 1'b0;

always @ (posedge Clk4 or negedge RESET4M_)
   if (!RESET4M_)
      GotEdgeD <= 1'b0;
   else if (EdgeD)
      GotEdgeD <= 1'b1;
   else if (ActTick)
      GotEdgeD <= 1'b0;

always @ (posedge Clk4 or negedge RESET4M_)
   if (!RESET4M_)
      begin
         ActivityA <= 1'b0;
         ActivityB <= 1'b0;
         ActivityC <= 1'b0;
         ActivityD <= 1'b0;
      end
   else if (ActTick)
      begin
         ActivityA <= GotEdgeA;
         ActivityB <= GotEdgeB;
         ActivityC <= GotEdgeC;
         ActivityD <= GotEdgeD;
      end ///////////////////////////////////////////////
// Load signals for holding registers
/////////////////////////////////////////////// assign LdHld      = BitCnt[2:0] == 3'b111;
assign LdKsrv     = LdHld & BitCnt[8:3] == 6'd63;
assign LdPrty     = LdHld & BitCnt[8:3] == 6'd0;
assign MsgSlot    = BitCnt[8:3] == 6'd61;
assign LdAlrm     = LdHld & BitCnt[8:3] == 6'd61;
assign LdPCMSig   = LdHld & BitCnt[8:3] == 6'd62;
assign LdPCM      = ~LdKsrv & ~LdPrty & ~LdMsg & ~LdAlrm;
assign LdSig      = LdHld & LdPCMSig & BitCnt[3];
                 // LdHld & LdPCMSig & ~BitCnt[3];

///////////////////////////////////////////////
// Holding registers for PCM and signalling
//
// Sig holding reg for interface A is not needed because the Sig buffer
// write occurs just as the shift byte arrives thus no holding reg is
// required.
/////////////////////////////////////////////// always @ (posedge Clk4 or negedge RESET4M_)
   begin
      if (!RESET4M_)
         begin
            PCMHldRegA <= 8'h00;
            PCMHldRegB <= 8'h00;
            PCMHldRegC <= 8'h00;
            PCMHldRegD <= 8'h00;
         end
      else if (LdPCM)
         begin
            PCMHldRegA <= TUDAReg;
            PCMHldRegB <= TUDBReg;
            PCMHldRegC <= TUDCReg;
            PCMHldRegD <= TUDDReg;
         end
   end always @ (posedge Clk4 or negedge RESET4M_)
   begin
      if (!RESET4M_)
         begin
            SigHldRegB <= 8'h00;
            SigHldRegC <= 8'h00;
            SigHldRegD <= 8'h00;
         end
      else if (LdSig)
         begin
            SigHldRegB <= TUDBReg;
            SigHldRegC <= TUDCReg;
            SigHldRegD <= TUDDReg;
         end
   end always @ (posedge Clk4 or negedge RESET4M_)
   begin
      if (!RESET4M_)
         begin
            PrtyHldRegA <= TUDAReg;
            PrtyHldRegB <= TUDBReg;
            PrtyHldRegC <= TUDCReg;
            PrtyHldRegD <= TUDDReg;
         end
      else if (LdPrty)
         begin
            PrtyHldRegA <= TUDAReg;
            PrtyHldRegB <= TUDBReg;
            PrtyHldRegC <= TUDCReg;
```

Appendix D  page 6

```verilog
        PrtyHldRegD <= TUDDReg;
    end

//////////////////////////////////////////////////////////////////////////
// Parity generation and storage
////////////////////////////////////////////////////////////////////////// assign LdPrtyAcc = LdRsrv & LdHld;

always @ (posedge Clk4 or negedge RESET4M_)
    if (!RESET4M_)
        begin
            PrtyByteA <= 8'h00;
            PrtyByteB <= 8'h00;
            PrtyByteC <= 8'h00;
            PrtyByteD <= 8'h00;
            PrtyAccA <= 8'h00;
            PrtyAccB <= 8'h00;
            PrtyAccC <= 8'h00;
            PrtyAccD <= 8'h00;
        end
    else if (LdPrtyAcc)
        begin
            PrtyByteA <= PrtyAccA;
            PrtyByteB <= PrtyAccB;
            PrtyByteC <= PrtyAccC;
            PrtyByteD <= PrtyAccD;
            PrtyAccA <= ~TUDAReg;
            PrtyAccB <= ~TUDBReg;
            PrtyAccC <= ~TUDCReg;
            PrtyAccD <= ~TUDDReg;
        end
    else if (LdHld)
        begin
            PrtyAccA <= PrtyAccA ^ TUDAReg;
            PrtyAccB <= PrtyAccB ^ TUDBReg;
            PrtyAccC <= PrtyAccC ^ TUDCReg;
            PrtyAccD <= PrtyAccD ^ TUDDReg;
        end assign PrtyErrA = LdPrtyErr & PrtyByteA != PrtyHldRegA;
assign PrtyErrB = LdPrtyErr & PrtyByteB != PrtyHldRegB;
assign PrtyErrC = LdPrtyErr & PrtyByteC != PrtyHldRegC;
assign PrtyErrD = LdPrtyErr & PrtyByteD != PrtyHldRegD;

assign PrtyErr = {PrtyErrD, PrtyErrC, PrtyErrB, PrtyErrA};

always @ (posedge Clk4 or negedge RESET4M_)
    if (!RESET4M_)
        begin
            UsPrtyErr <= 4'h0;
        end
    else if (LdPrtyErr)
        begin
            UsPrtyErr <= PrtyErr;
        end //////////////////////////////////////////////////////////////////////////
// Message control and storage
////////////////////////////////////////////////////////////////////////// assign RcvMsgTick = LdPrty & MsgFrmCnt == 2'b00;

assign ErlyLdMsg      = MsgSlot & BitCnt[2:0] == 3'b110;

assign LdMsgIntNum = ErlyLdMsg & MsgFrmCnt[1:0] == 2'b00;

always @ (posedge Clk4 or negedge RESET4M_)
    if (!RESET4M_)
        begin
            MsgIntNumS <= 2'b00;
        end
    else if (LdMsgIntNum)
        begin
            MsgIntNumS <= MsgIntNum;
        end assign MsgByte =  (TUDAReg & {8{MsgIntNumS == 2'b00}} |
                   (TUDBReg & {8{MsgIntNumS == 2'b01}} |
                   (TUDCReg & {8{MsgIntNumS == 2'b10}} |
                   (TUDDReg & {8{MsgIntNumS == 2'b11}}));

assign LdMsg      = MsgSlot & LdHld;

assign LdMsgCmd   = LdMsg & MsgFrmCnt == 2'b00;
assign LdMsgHAdd  = LdMsg & MsgFrmCnt == 2'b01;
assign LdMsgLAdd  = LdMsg & MsgFrmCnt == 2'b10;
assign LdMsgRcD   = LdMsg & MsgFrmCnt == 2'b11;

always @ (posedge Clk4 or negedge RESET4M_)
    if (!RESET4M_)
        begin
            MsgHldCmd  <= 8'h00;
            MsgHldHAdd <= 8'h00;
            MsgHldLAdd <= 8'h00;
        end
    else
        begin
            MsgHldCmd  <= (LdMsgCmd)  ? MsgByte : MsgHldCmd;
            MsgHldHAdd <= (LdMsgHAdd) ? MsgByte : MsgHldHAdd;
            MsgHldLAdd <= (LdMsgLAdd) ? MsgByte : MsgHldLAdd;
        end always @ (posedge Clk4 or negedge RESET4M_)
    if (!RESET4M_)
        begin
            MsgCmd  <= 8'h00;
            MsgHAdd <= 8'h00;
            MsgLAdd <= 8'h00;
            MsgRcD  <= 8'h00;
        end
    else if (LdMsgRcD)
        begin
            MsgCmd  <= MsgHldCmd;
            MsgHAdd <= MsgHldHAdd;
            MsgLAdd <= MsgHldLAdd;
            MsgRcD  <= MsgByte;
        end
```

Appendix D page 7

```verilog
///////////////////////////////////////////////////////////////////////////////
// Down-stream parity alarm
///////////////////////////////////////////////////////////////////////////////
assign DsPrtyAlmA = LdAlrm & TUDAReg[7];
assign DsPrtyAlmB = LdAlrm & TUDBReg[7];
assign DsPrtyAlmC = LdAlrm & TUDCReg[7];
assign DsPrtyAlmD = LdAlrm & TUDDReg[7];

assign UsMiscAlm1A = LdAlrm & TUDAReg[6];
assign UsMiscAlm1B = LdAlrm & TUDBReg[6];
assign UsMiscAlm1C = LdAlrm & TUDCReg[6];
assign UsMiscAlm1D = LdAlrm & TUDDReg[6];

assign UsMiscAlm2A = LdAlrm & TUDAReg[5];
assign UsMiscAlm2B = LdAlrm & TUDBReg[5];
assign UsMiscAlm2C = LdAlrm & TUDCReg[5];
assign UsMiscAlm2D = LdAlrm & TUDDReg[5];

///////////////////////////////////////////////////////////////////////////////
// Decode of bit counter to get misc control addresses and signals
///////////////////////////////////////////////////////////////////////////////
always @ (BitCnt)
begin
    if (BitCnt[8:4] == 5'd31 | BitCnt[8:4] == 5'd0)
        begin
            PtrRAddLwr = 2'b00;
            PtrRReqUSa = 1'b0;
        end
    else
        case (BitCnt[3:0])
            4'b0101 : begin
                          PtrRAddLwr = 2'b00;
                          PtrRReqUSa = 1'b1;
                      end
            4'b0110 : begin
                          PtrRAddLwr = 2'b00;
                          PtrRReqUSa = 1'b0;
                      end
            4'b0111 : begin
                          PtrRAddLwr = 2'b01;
                          PtrRReqUSa = 1'b1;
                      end
            4'b1000 : begin
                          PtrRAddLwr = 2'b01;
                          PtrRReqUSa = 1'b0;
                      end
            4'b1010 : begin
                          PtrRAddLwr = 2'b10;
                          PtrRReqUSa = 1'b1;
                      end
            4'b1011 : begin
                          PtrRAddLwr = 2'b10;
                          PtrRReqUSa = 1'b0;
                      end
            4'b1100 : begin
                          PtrRAddLwr = 2'b11;
                          PtrRReqUSa = 1'b1;
                      end
            4'b1101 : begin
                          PtrRAddLwr = 2'b11;
                          PtrRReqUSa = 1'b0;
                      end
            default : begin
                          PtrRAddLwr = 2'b00;
                          PtrRReqUSa = 1'b0;
                      end
        endcase
end ///////////////////////////////////////////////////////////////////////////////
// Generate pointer RAM signals using synchronous delays
// Also generate read blocking signal for other side of signalling RAM
///////////////////////////////////////////////////////////////////////////////
always @ (posedge Clk4 or negedge RESET4M_)
    if (!RESET4M_)
        begin
            PtrRReqUSb <= 1'b0;
            UsSigRdBlk4M <= 1'b0;
        end
    else
        begin
            PtrRReqUSb <= ~PtrRACkUS & PtrRReqUSa;
            UsSigRdBlk4M <= PtrRReqUSa;
        end assign PtrRAddUS = {PtrRAddLwr,BitCnt[8:4]};
assign PtrRReqUS = PtrRReqUSa | PtrRReqUSb;

///////////////////////////////////////////////////////////////////////////////
// Stored info from pointer RAM
///////////////////////////////////////////////////////////////////////////////
always @ (posedge Clk4 or negedge RESET4M_)
    begin
        if (!RESET4M_)
            begin
                UsPWAddLwr <= 7'h00;
                SigEn <= 1'b0;
                PCMEn <= 1'b0;
            end
        else if (PtrRACkUS)
            begin
                UsPWAddLwr <= PtrRDOutDUS[8:2];
                SigEn <= PtrRDOutDUS[1];
                PCMEn <= PtrRDOutDUS[0];
            end
    end assign UsPWAdd = {FrmCnt[0],UsPWAddLwr};

///////////////////////////////////////////////////////////////////////////////
// Generate PCM and signalling RAM signals using synchronous delays
///////////////////////////////////////////////////////////////////////////////
always @ (posedge Clk4 or negedge RESET4M_)
    if (!RESET4M_)
        begin
            IntAdd <= 2'b00;
            UsWen <= 1'b0;
            UsSigRdBlk4M <= 1'b0;
        end
    else
        begin
            IntAdd <= PtrRAddLwr;
            UsWen <= UsSigRdBlk4M;
        end assign UsSigWAdd = UsPWAddLwr;
```

Appendix D  page 8

```
assign UsPWen = UsWen & PCMEn;

assign UsSigWen = UsWen & SigEn;

///////////////////////////////////////////////////////////////////////
// Input muxes for PCM and signalling RAMs
//   Input A of Sig mux is different than the others -- see holding
//   reg comment above
/////////////////////////////////////////////////////////////////////// assign SelIntA = IntAdd == 2'b00;
assign SelIntB = IntAdd == 2'b01;
assign SelIntC = IntAdd == 2'b10;
assign SelIntD = IntAdd == 2'b11;

assign SelSigA = SelIntA & ~UpAIS[0];
assign SelSigB = SelIntB & ~UpAIS[1];
assign SelSigC = SelIntC & ~UpAIS[2];
assign SelSigD = SelIntD & ~UpAIS[3];

assign SelPCMA = SelIntA & ~UpAIS[0];
assign SelPCMB = SelIntB & ~UpAIS[1];
assign SelPCMC = SelIntC & ~UpAIS[2];
assign SelPCMD = SelIntD & ~UpAIS[3];

assign SelAIS = SelIntA & UpAIS[0]
              | SelIntB & UpAIS[1]
              | SelIntC & UpAIS[2]
              | SelIntD & UpAIS[3];

assign UsSigIn = (SigAISByte & {8{SelAIS}})
               | (TUDAReg    & {8{SelSigA}})
               | (SigHldRegB & {8{SelSigB}})
               | (SigHldRegC & {8{SelSigC}})
               | (SigHldRegD & {8{SelSigD}});

assign UsPDIn  = (PCMAISByte & {8{SelAIS}})
               | (PCMHldRegA & {8{SelPCMA}})
               | (PCMHldRegB & {8{SelPCMB}})
               | (PCMHldRegC & {8{SelPCMC}})
               | (PCMHldRegD & {8{SelPCMD}});

endmodule // tustint
```

APPENDIX E

```
// tusrmictl.v :   Up-stream RAM output control
//
// Functional desription:
//
//
// synthesis constraints
//
//  sc   clkList = (clk19)
//  sc   create_clock clk19 -period 40 -waveform (0 20) clkList
//  sc   set_clock_skew -uncertainty 3 clkList
//  sc   set_fix_hold clkList
//  sc   set_false_path -from (iRESET_)
//  sc   set_dont_touch_network clkList
//  sc   set_dont_touch_network usclk19b
//  sc   set_load 32 * load_off(mSc/CMDF00/D) usclk19b module tusrmictl
(
    iRESET_,
    clk19,
    usclk19b,
    TxD,
    TxDVld,
    tETxCellType,
    tTxCellType,
    ETxSOH,
    ETxSFCnt,
    ETxGrpCnt,
    ETxDS0Cnt,
    tTxSOH,
    TxCellCnt,
    TxGrpCnt,
    TxDS0Cnt,
    TxPcmHit,
    StBlkSz0,
    StBlkSz1,
    UsPDOut,
    UsPRAdd,
    UsPRen,
    UsSigDOut,
    UsSigRAdd,
    UsSigRen,
    DlyDOut,
    DlyWAdd,
    DlyWen,
    DlyDIn,
    DlyRAdd,
    DlyRen,
    UsSigRdBlk,
    ETxFS
);

input           iRESET_;
input           clk19;
input           tETxCellType;     //Early transmit cell type
input           tTxCellType;      //Transmit cell type
input           tTxSOH;           //Up-stream SONET overhead enable
input           ETxSOH;           //Early up-stream SONET overhead enable
input   [2:0]   ETxSFCnt;         //Early up-stream super frame count
input   [2:0]   ETxGrpCnt;        //Early POTS group number within the current
input   [3:0]   ETxDS0Cnt;        //Up-stream TDM cell
                                  //Early DS0 number within the current
input   [5:0]   TxCellCnt;        //Up-stream POTS group
input   [2:0]   TxGrpCnt;         //Up-stream SPE cell number
                                  //POTS group number within the current
input   [3:0]   TxDS0Cnt;         //Up-stream TDM cell
                                  //DS0 number within the current
input   [31:0]  TxPcmHit;         //Up-stream POTS group
input   [31:0]  StBlkSz0;         //Up-stream hit signals from CAM
input   [31:0]  StBlkSz1;         //Bit 0 of all stored CAM block size counts
input           UsSigRdBlk;       //Bit 1 of all stored CAM block size counts
input   [7:0]   UsPDOut;          //
input   [8:0]   DlyDOut;          //Up-stream PCM RAM data-out
input   [7:0]   UsSigDOut;        //Delay RAM data-out
                                  //Up-stream signalling RAM data-out
output          usclk19b;         //
output  [7:0]   TxD;              //Up-stream SONET frame data
output          TxDVld;           //Up-stream SONET valid frame data signal
output  [7:0]   UsPRAdd;          //Up-stream PCM RAM address-In
output  [4:0]   DlyRAdd;          //Delay RAM read address
output  [4:0]   DlyWAdd;          //Delay RAM write address
output          DlyRen;           //Delay RAM read enable
output          DlyWen;           //Delay RAM write enable
output          DlyDIn;           //Delay RAM data-in
output  [8:0]   UsPRen;           //Up-stream PCM RAM read enable
output          UsSigRAdd;        //Up-stream Signalling RAM read address
output  [6:0]   UsSigRen;         //Up-stream Signalling RAM read enable
output          ETxFS;            //Early transmitt frame sync output // local declarations
integer         i;

reg             Hit;              //
reg     [4:0]   HitAdd;           //
reg             AddSt;            //
reg             dETxSOH;          //
reg             nUsPRen;          //
reg             UsPRen;           //
reg             ValidGrp;         //
reg             SigFlg;           //
reg             DlyWen;           //
reg             DlyRen;           //
reg             TxSigSel;         //
reg             ETxFS;            //
reg     [4:0]   StHitAdd;         //
reg     [5:0]   StPRAdd;          //
reg     [1:0]   StBlkSz;          //
reg     [1:0]   BlkCntr;          //
reg             nBlkCntr;         //
reg     [2:0]   UsPRAddLwr;       //
reg     [2:0]   dETxGrpCnt;       //
reg     [3:0]   dETxDS0Cnt;       //
reg     [1:0]   SigwAdd;          //
reg     [6:0]   UsSigRAdd;        //
reg     [7:0]   SigReg0;          //
reg     [7:0]   SigReg1;          //
reg     [8:0]   SigReg2;          //
reg     [1:0]   DlyDIn;           //
reg     [1:0]   ETdmCellDly;      //
reg     [4:0]   DlyWAdd;          //
reg     [7:0]   TxD;              //
reg             TxDVld;           //
reg             SigFlgR0;         //
```

```verilog
reg         SigFlgR1;          //
reg         SigFlgR2;          //
reg         TxOEn;             //
reg         dDlyWen;           // wire        nAddSt;            //
wire        BlkCntr0;          //
wire        BlkSz0;            //
wire        Busy;              //
wire        pValidGrp;         //
wire        SigHit;            //
wire        UsSigRen;          //
wire        WeSigReg0;         //
wire        WeSigReg1;         //
wire        WeSigReg2;         //
wire        nTxSigDSel;        //
wire        SigReg0Hit;        //
wire        SigReg1Hit;        //
wire        SigReg2Hit;        //
wire [1:0]  BlkSz;             //
wire [7:0]  UsPRAdd;           //
wire [7:0]  TxSigD;             //
wire        SigFlgRAllClr;     //
wire        SigFlgR0Clr;       //
wire        SigFlgR1Clr;       //
wire        SigFlgR2Clr;       //
wire        UsClk19b;          //
wire        nTxDVld;           //
wire        TxSigDSelQ;        //

///////////////////////////////////////////////////////////////////
// Parameters
parameter   DlyOffset    = 5'd8,
            TxFSCelNum   = 6'd40,
            TxFSGrpNum   = 3'd3,
            TxFSDS0Num   = 4'd1;
///////////////////////////////////////////////////////////////////
// Common stuff
///////////////////////////////////////////////////////////////////
// ock inversion for up-stream signalling and PCM RAMs
///////////////////////////////////////////////////////////////////
// Priority encoder with error signal for more than one CAM location hit
/////////////////////////////////////////////////////////////////// assign UsClk19b = ~Clk19;

always @ ( TxPcmHit )
  begin
    Hit    = 1'b0;
    HitAdd = 5'b00000;
    for (i = 31; i >= 0; i = i -1)
      begin
        if (TxPcmHit[i])
          begin
            Hit    = 1'b1;
            HitAdd = i;
          end
      end
  end
///////////////////////////////////////////////////////////////////
// Hit address latch                Latches address on CAM hit
///////////////////////////////////////////////////////////////////
always @ (posedge Clk19 or negedge iRESET_)
  begin
    if (!iRESET_)
      begin
        StHitAdd <= 5'b00000;
      end
    else if (Hit & ~Busy)
      begin
        StHitAdd <= HitAdd;
      end
  end
///////////////////////////////////////////////////////////////////
// RAM address latch
///////////////////////////////////////////////////////////////////
always @ (posedge Clk19 or negedge iRESET_)
  begin
    if (!iRESET_)
      begin
        StPRAdd <= 6'b000000;
        StBlkSz <= 2'b00;
      end
    else if (AddSt)
      begin
        StPRAdd <= {ETxSFCnt[0],StHitAdd};
        StBlkSz <= BlkSz;
      end
  end
///////////////////////////////////////////////////////////////////
// Block size multiplexer to retrieve the stored block size of the hit CAM
// location
///////////////////////////////////////////////////////////////////
assign BlkSz = {StBlkSz1[StHitAdd],StBlkSz0[StHitAdd]};
///////////////////////////////////////////////////////////////////
// PCM RAM address and data control
///////////////////////////////////////////////////////////////////
// Delayed Hit signal used as a strobe to store the CAM hit address, as a start
// signal for the BlkCntr, and as a RAM read enable for the first DS0.
///////////////////////////////////////////////////////////////////
assign nAddSt = Hit & ~Busy;

always @ (posedge Clk19 or negedge iRESET_)
  begin
    if (!iRESET_)
      begin
        AddSt   <= 1'b0;
        dETxSOH <= 1'b0;
      end
    else
      begin
```

Appendix E page 2

```verilog
        AddSt <= nAddSt;
        dETxSOH <= ETxSOH;
    end
////////////////////////////////////////////////////////////////
// Byte counter and control
////////////////////////////////////////////////////////////////
assign BlkCntr0 = (BlkCntr == 2'b00);
assign BlkSz0 = (BlkSz == 2'b00);

always @ (posedge Clk19 or negedge iRESET_)
    begin
    if (!iRESET_)
        BlkCntr <= 2'b00;
    else
        BlkCntr <= nBlkCntr;
    end always @ (AddSt or StBlkSz or BlkSz0 or dETxSOH or BlkCntr0 or BlkCntr)
    begin
    if (AddSt & ~BlkSz0)
        nBlkCntr = 2'b01;
    else if (!dETxSOH)
        if (BlkCntr >= StBlkSz) || BlkCntr0)
            nBlkCntr = 2'b00;
        else
            nBlkCntr = BlkCntr + 1'b1;
    else
        nBlkCntr = BlkCntr;
    end assign Busy = nBlkCntr != 2'b00;

////////////////////////////////////////////////////////////////
// PCM RAM read address and read enable
////////////////////////////////////////////////////////////////
always @ (posedge Clk19 or negedge iRESET_)
    begin
    if (!iRESET_)
        begin
        UsPRAddLwr <= 2'b00;
        nUsPRen <= 2'b0;
        UsPRen <= 1'b0;
        end
    else
        begin
        UsPRAddLwr <= BlkCntr;
        nUsPRen <= nAddSt | ~ETxSOH & ~(nBlkCntr == 2'b00);
        UsPRen <= nUsPRen;
        end
    end assign UsPRAdd = {StPRAdd,UsPRAddLwr};

////////////////////////////////////////////////////////////////
// Signalling RAM address and data control
////////////////////////////////////////////////////////////////
assign pValidGrp = tETxCellType & (ETxGrpCnt != 3'b111);

always @ (posedge Clk19 or negedge iRESET_)
    begin
    if (!iRESET_)
        begin
        dETxGrpCnt <= 3'b000;
        dETxOSOCnt <= 4'b0000;
        ValidGrp <= 1'b0;
        end
    else
        begin
        dETxGrpCnt <= ETxGrpCnt;
        dETxOSOCnt <= ETxOSOCnt;
        ValidGrp <= pValidGrp;
        end
    end assign SigHit = ~dETxSOH & ValidGrp & ((1'b0,ETxSFCnt) == dETxOSOCnt) & (nUsPRen);

always @ (posedge Clk19 or negedge iRESET_)
    if (!iRESET_)
        SigWAdd <= 2'b00;
    else if (SigHit)
        begin
        if (dETxGrpCnt == 3'd0  | dETxGrpCnt == 3'd3) SigWAdd <= 2'b00;
        if (dETxGrpCnt == 3'd1  | dETxGrpCnt == 3'd4) SigWAdd <= 2'b01;
        if (dETxGrpCnt == 3'd2  | dETxGrpCnt == 3'd5) SigWAdd <= 2'b10;
        end always @ (posedge Clk19 or negedge iRESET_)
    begin
    if (!iRESET_)
        UsSigRAdd <= 7'h00;
    else if (SigHit)
        UsSigRAdd <= ((AddSt) ? StHitAdd : StPRAdd{4:0}),BlkCntr};
    end assign UsSigWRen = SigFlg & ~UsSigRdBlk;

assign WeSigReg0 = UsSigRen & SigWAdd == 2'b00;
assign WeSigReg1 = UsSigRen & SigWAdd == 2'b01;
assign WeSigReg2 = UsSigRen & SigWAdd == 2'b10;

assign SigFlgRAllClr = ~(EtdmCelIDly[0] | DlyRen);

always @ (posedge Clk19 or negedge iRESET_)
    if (!iRESET_)
        SigFlg0 <= 1'b0;
    else if (SigFlgR0 & (SigFlgR0Clr | SigFlgRAllClr))
        SigFlgR0 <= 1'b0;
    else if (~SigFlgR0 & WeSigReg0)
        SigFlgR0 <= 1'b1;

always @ (posedge Clk19 or negedge iRESET_)
    if (!iRESET_)
        SigFlgR1 <= 1'b0;
    else if (SigFlgR1 & (SigFlgR1Clr | SigFlgRAllClr))
        SigFlgR1 <= 1'b0;
```

```verilog
            else if (-SigFlgR1 & WeSigReg1)
                SigFlgR1 <= 1'b1;

always @ (posedge Clk19 or negedge iRESET_)
        if (!iRESET_)
            SigFlgR2 <= 1'b0;
        else if (SigFlgR2 & (SigFlgR2Clr | SigFlgRAllClr))
            SigFlgR2 <= 1'b0;
        else if (-SigFlgR2 & WeSigReg2)
            SigFlgR2 <= 1'b1;

always @ (posedge Clk19 or negedge iRESET_)
        if (!iRESET_)
            SigReg0 <= 8'h00;
        else if (WeSigReg0)
            SigReg0 <= UsSigDOut;

always @ (posedge Clk19 or negedge iRESET_)
        if (!iRESET_)
            SigReg1 <= 8'h00;
        else if (WeSigReg1)
            SigReg1 <= UsSigDOut;

always @ (posedge Clk19 or negedge iRESET_)
        if (!iRESET_)
            SigReg2 <= 8'h00;
        else if (WeSigReg2)
            SigReg2 <= UsSigDOut;

//////////////////////////////////////////////////////////////////////
    // Delay RAM write and read address and control signals and final TxD data
    // muxing and retiming
    ////////////////////////////////////////////////////////////////////// always @ (posedge Clk19 or negedge iRESET_)
        if (!iRESET_)
            DlyIn <= 9'd0;
        else
            DlyIn <= {UsPRen,(UsPRen) ? UsPDOut : 8'h00};

always @ (posedge Clk19 or negedge iRESET_)
        if (!iRESET_)
            begin
                ETdmCellDly <= 2'b00;
                DlyWen <= 1'b1;
                dDlyWen <= 1'b0;
                DlyWAdd <= 5'b00000;
                DlyRAdd <= 5'b00000;
                DlyRen <= 1'b0;
                TxSigDSel <= 1'b0;
            end
        else
            begin
                ETdmCellDly <= {ETdmCellDly[0],tETdmCellType};
                DlyWen <= ETdmCellDly[1];
                dDlyWen <= DlyWen;
                DlyWAdd <= DlyWAdd + 1'b1;
                DlyRAdd <= DlyWAdd + DlyOffset;
                DlyRen <= tTxCellType;
                TxSigDSel <= nTxSigDSel;
            end assign nTxSigDSel = tTxCellType & -tTxSOH & (TxDSOCnt == 4'b1000);

assign SigReg0Hit = TxGrpCnt == 3'd0 | TxGrpCnt == 3'd3;
    assign SigReg1Hit = TxGrpCnt == 3'd1 | TxGrpCnt == 3'd4;
    assign SigReg2Hit = TxGrpCnt == 3'd2 | TxGrpCnt == 3'd5;

assign SigFlgR0Clr = TxSigDSel & SigReg0Hit;
    assign SigFlgR1Clr = TxSigDSel & SigReg1Hit;
    assign SigFlgR2Clr = TxSigDSel & SigReg2Hit;

assign TxSigD = (SigReg0 & {8{(SigReg0Hit & SigFlgR0)}}) |
                    (SigReg1 & {8{(SigReg1Hit & SigFlgR1)}}) |
                    (SigReg2 & {8{(SigReg2Hit & SigFlgR2)}});

assign nTxDVld = DlyDOut[8];
                        SigFlgR0 & SigFlgR0Clr
                        SigFlgR1 & SigFlgR1Clr
                        SigFlgR2 & SigFlgR2Clr;

always @ (posedge Clk19 or negedge iRESET_)
        if (!iRESET_)
            begin
                TxDEn <= 1'b0;
            end
        else if (-DlyWen & dDlyWen)
            begin
                TxDEn <= 1'b1;
            end assign TxSigDSelq = TxSigDSel & -DlyDOut[8];

always @ (posedge Clk19 or negedge iRESET_)
        if (!iRESET_)
            begin
                TxDVld <= 1'b0;
                TxD <= 8'h00;
            end
        else
            begin
                TxDVld <= (DlyRen & TxDEn) ? nTxDVld : 1'b0;
                TxD <= (DlyRen & TxDEn) ? ((TxSigDSelq) ? TxSigD: DlyDOut[7:0]) : 8'h00;
            end //////////////////////////////////////////////////////////////////////
    // Generation of early frame sync signal
    //////////////////////////////////////////////////////////////////////
    always @ (posedge Clk19 or negedge iRESET_)
        begin
            if (!iRESET_)
                begin
                    ETxFS <= 1'b0;
                end
            else
                begin
                    ETxFS <= TxCellCnt == TxFSCellNum &
                             TxGrpCnt == TxFSGrpNum &
                             TxDSOCnt == TxFSDSONum;
                end
        end endmodule // tusmictl
```

Appendix E page 4

I claim:

1. In a communication system that transmits a signal stream having signals for a number of sets of communication devices, a method of extracting signals for a first set of communication devices from the signal stream, the method comprising the steps of:

(a) storing information identifying locations, in the signal stream, of sets of signals, said sets of signals including at least one set of signals for the first set of communication devices;

(b) simultaneously comparing information identifying locations of received sets of signals in a received signal stream to a number of the stored information identifying locations;

(c) when an information identifying a location of a first set of signals matches the stored information identifying a location of the set of signals for the first set of communication devices, extracting the first set of signals from the signal stream;

(d) generating routing signals, wherein the generating includes generating memory address and control signals; and (e) routing said extracted first set of signals to the first set of communication devices based on the routing signals, wherein the routing includes using the generated memory signals to store the extracted first set of signals in a memory.

2. The method of claim 1 wherein the routing step further includes the step of reading said memory to extract the first set of signals, and forwarding the read-out first set of signals to the first set of communication devices.

3. In a communication system that transmits a signal stream having signals for different communication applications, a method of extracting signals for a first type of communication application from a received signal stream, the method comprising the steps of:

(a) storing position identifying signals identifying the location of sets of signals for the first type of application in the received signal stream;

(b) generating a position identifying signal for each received set of signals in the received signal stream;

(c) simultaneously comparing the generated position identifying signal for each received set of signals with a number of the stored position identifying signals;

(d) when one of the generated position identifying, signals matches one of the stored position identifying signals, extracting from the signal stream the set of signals corresponding to the generated position identifying signal;

(e) generating routing signals, wherein the generating includes generating memory address and control signals; and (f) routing said extracted first set of signals to the first set of communication devices based on the routing signals, wherein the routing includes using the generated memory signals to store the extracted first set of signals in a memory.

4. In a communication system that transmits a signal stream having signals for a number of sets of communication devices, a method of inserting signals for a first set of communication devices into the signal stream, the method comprising the steps of:

(a) for each set of signals for transmission from the first set of communication devices, storing a pointer that identifies the location of the sets of signals in the signal stream;

(b) generating pointers identifying locations of sets of signals in the signal stream;

(c) simultaneously comparing each generated pointer with a number of the stored pointers; and (d) when a generated pointer matches a stored pointer, generating memory address and control signals, using the generated memory signals to retrieve from a memory a set of signals corresponding to the matched pointer, and inserting into the signal stream the set of signals corresponding to the matched stored pointer.

5. In a communication system that transmits a signal stream having signals for a number of sets of communication devices, a method of inserting signals for a first set of communication devices into the signal stream, the method comprising the steps of:

(a) for each set of signals for transmission from the first set of communication devices, storing a pointer that identifies the time period for transmitting the set of signals;

(b) while transmitting the signal stream, generating pointers to identify time periods for transmitting sets of signals; (c) simultaneously comparing each generated pointer with a number of the stored pointers; and (d) when a generated pointer matches a stored pointer, generating memory address and control signals, using the generated memory signals to retrieve from a memory a set of signals, from the first set of communication devices, corresponding to the matched pointer, and inserting into the signal stream the set of signals corresponding to the matched stored pointer.

6. A time division demultiplexing method, said method comprising the step of using a content addressable memory for storing information identifying locations of sets of signals in a signal stream to identify sets of signals that need to be extracted from the signal stream and a memory interface for generating routing signals, wherein the generating includes generating memory address and control signals, and for routing the extracted sets of signals to a first set of communication devices based on the routing signals, wherein the routing includes using the generated memory signals to store the extracted signals in a memory.

7. A time division multiplexing method, said method comprising the step of using a content addressable memory to identify time periods for inserting sets of signals into a signal stream and a memory interface for generating memory address and control signals and for using the generated memory signals to retrieve the sets of signals, from a memory, to be inserted into the signal stream.

8. In a fiber optic telecommunication network, an optical network unit receiving a signal stream having signals for a telephony application and signals for a non-telephony application, said optical network unit having a content addressable memory, said memory storing information identifying locations of signals for the telephony application in the received signal stream, and a memory interface coupled to the content addressable memory, said memory interface generating memory address and control signals and using the generated memory signals for storing extracted signals from the received signal stream in a memory.

9. In a communication system that transmits a signal stream having signals for a number of sets of communication devices, an apparatus for extracting signals for a first set of communication devices from the signal stream, the apparatus comprising:

(a) a memory for storing position identifying signals identifying the locations, in the signal stream, of sets of signals for the first set of communication devices;

(b) a comparator coupled to the memory, wherein, for each received set of signals, the comparator receives a position identifying signal identifying the location of the received set of signals, the comparator simultaneously comparing each received position identifying signal with a number of the stored position identifying signals, wherein, when a position identifying signal of a first set of signals matches a stored position identifying signal, the comparator generates a signal indicating that the first set of signals have to be extracted from the signal stream; and (c) a memory interface coupled to the comparator, wherein in response to the signal from the comparator, said memory interface extracts the first set of signals from the signal stream and generates address and control signals for storing the extracted signals in a memory for storing extracted signals.

10. In a communication system that transmits a signal stream having signals for a number of sets of communication devices, an apparatus for inserting signals from a first set of communication devices into the signal stream, the apparatus comprising:

(a) a memory for storing position identifying signals identifying the locations, in the signal stream, for sets of signals from the first set of communication devices;

(b) a comparator coupled to the memory, wherein, while transmitting the signal stream, the comparator receives position identifying signals identifying the locations of the set of signals in the signal stream, the comparator simultaneously comparing each received position identifying signal with a number of the stored position identifying signals, wherein, when a position identifying signal matches a stored position identifying signal of a first set of signals, the comparator generates a signal indicating that the first set of signals have to be inserted into the signal stream;

(c) a memory interface coupled to the comparator, wherein in response to the signal from the comparator, said memory interface generates memory address and control signals and uses the memory signals to retrieve the first set of signals from a memory storing the first set of signals.

11. A time division demultiplexer comprising a content addressable memory for storing information identifying locations of sets of signals in a signal stream to identify sets of signals that need to be extracted from the signal stream and a memory interface for generating routing signals, wherein the generating includes generating memory address and control signals, and for routing the extracted sets of signals to a first set of communication devices based on the routing signals, wherein the routing includes using the generated memory signals to store the extracted signals in a memory.

12. A time division multiplexer comprising a content addressable memory to identify time periods for inserting sets of signals into a signal stream and a memory interface for generating memory address and control signals and for using the generated memory signals to retrieve the sets of signals, from a memory, to be inserted into the signal stream.

13. The method of claim 3, wherein the routing step further includes the step of reading the memory to extract the first set of signals, and forwarding the read-out first set of signals to the first set of communication devices.

14. The method of claim 13, wherein the routing step further includes generating addresses of the memory and using the addresses to read the memory to extract the first set of signals from the memory.

15. The method of claim 4 further comprising the step of generating addresses for the memory and using the addresses to store the set of signals in the memory.

16. The method of claim 15 further comprising storing the set of signals retrieved from the memory in a delay buffer prior to inserting the set of signals retrieved from the memory into the signal stream.

17. The method of claim 5 further comprising storing the set of signals retrieved from the memory in a delay buffer prior to inserting the set of signals retrieved from the memory into the signal stream.

18. The method of claim 17 further comprising the step of generating addresses for the memory and using the addresses to store the set of signals in the memory.

19. The apparatus of claim 9 further comprising an interface for reading the memory to extract the first set of signals and for forwarding the read-out first set of signals to the first set of communication devices.

20. The apparatus of claim 19 further comprising a pointer control for causing a pointer table to generate addresses of the memory, wherein the pointer control supplies the addresses to the interface to read the memory to extract the first set of signals from the memory.

21. The apparatus of claim 10 further comprising an interface for routing the first set of signals from the first set of communication devices to the memory and for writing the first set of signals in the memory.

22. The apparatus of claim 21 further comprising a pointer control for causing a pointer table to generate addresses of the memory, wherein the pointer control supplies the addresses to the interface to route the first set of signals to the memory.

23. The apparatus of claim 22 further comprising a delay buffer for storing the first set of signals retrieved from the memory before the first set of signals is inserted into the signal stream.

* * * * *